United States Patent
Naito

(10) Patent No.: US 7,624,359 B2
(45) Date of Patent: Nov. 24, 2009

(54) SERVER APPARATUS FOR OUTPUTTING COMPOSED IMAGE INCLUDING COMPOSED CONTENTS SUCH AS IMAGE AND DOCUMENT IN TEMPLATE, CONTROL METHOD THEREFOR, PROGRAM FOR EXECUTION THEREOF BY COMPUTER, AND COMPUTER READABLE STORAGE MEDIUM STORING THE PROGRAM

(75) Inventor: Kikuo Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/959,245

(22) Filed: Oct. 7, 2004

(65) Prior Publication Data

US 2005/0102618 A1    May 12, 2005

(30) Foreign Application Priority Data

| Oct. 9, 2003 | (JP) | ............................. 2003-350877 |
| Oct. 9, 2003 | (JP) | ............................. 2003-350878 |
| Oct. 9, 2003 | (JP) | ............................. 2003-350879 |
| Oct. 9, 2003 | (JP) | ............................. 2003-350880 |

(51) Int. Cl.
*G06F 17/00* (2006.01)
(52) U.S. Cl. .................. 715/864; 715/252; 715/227
(58) Field of Classification Search ......... 715/810–864, 715/105–115; 358/537, 1.15; 355/40–50
See application file for complete search history.

(56) References Cited

U.S. PATENT DOCUMENTS

| 6,674,445 | B1 * | 1/2004 | Chithambaram et al. ..... 345/619 |
| 6,940,526 | B2 * | 9/2005 | Noda et al. .................. 345/629 |
| 2002/0056131 | A1 * | 5/2002 | Hayashi et al. ............. 725/115 |
| 2002/0057454 | A1 * | 5/2002 | Ueda et al. .................. 358/1.15 |
| 2003/0038787 | A1 * | 2/2003 | Nishiyama .................. 345/169 |
| 2003/0065531 | A1 | 4/2003 | Satomi et al. .................. 705/1 |
| 2004/0090527 | A1 * | 5/2004 | Kanevsky et al. ......... 348/207.1 |
| 2004/0254852 | A1 | 12/2004 | Myoki et al. .................. 705/26 |

* cited by examiner

*Primary Examiner*—Doug Hutton
*Assistant Examiner*—Quoc A Tran
(74) *Attorney, Agent, or Firm*—Fitzpatrick, Cella, Harper & Scinto

(57) ABSTRACT

When a user client requests an output of a composed image in which contents such as an image or a document are composed in a frame provided by a printing provider, an instruction for the composition of the contents and the template by a simple operation can be made. A server apparatus of the printing provider stores a table, showing correspondence between numeral keys of the user client and a composing position of the contents to the template or a size change in the contents, in a memory. Based on a mere information on the contents and the numeral keys from the user client, the server apparatus composes and outputs the contents with the template.

4 Claims, 15 Drawing Sheets

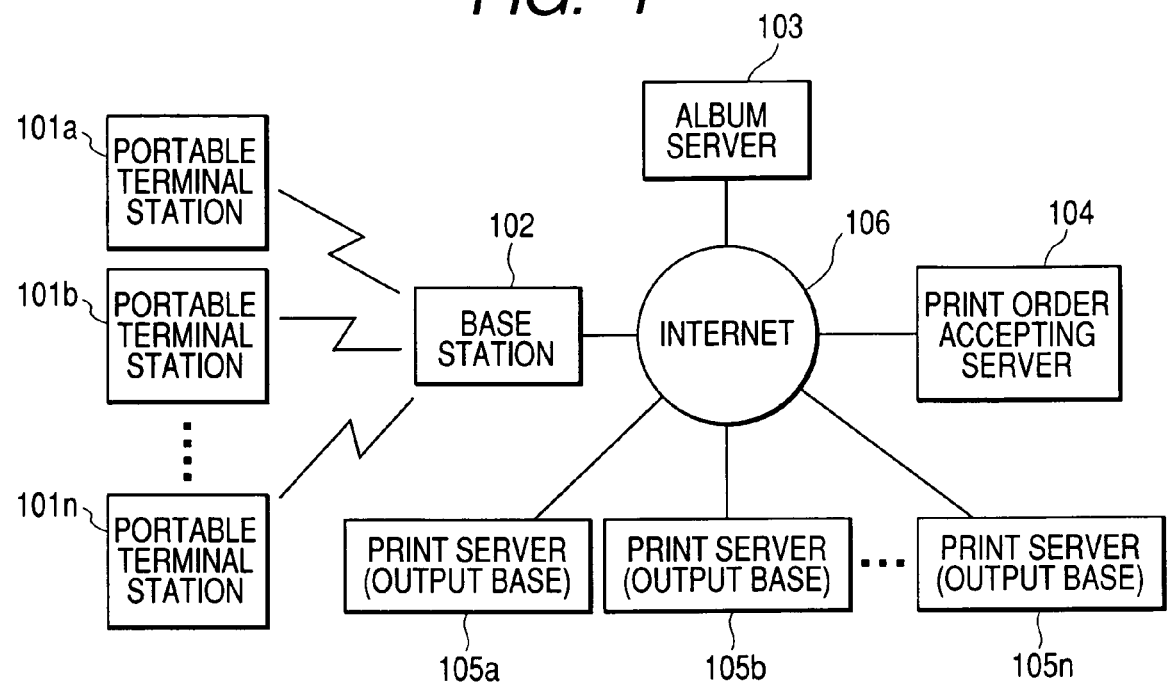
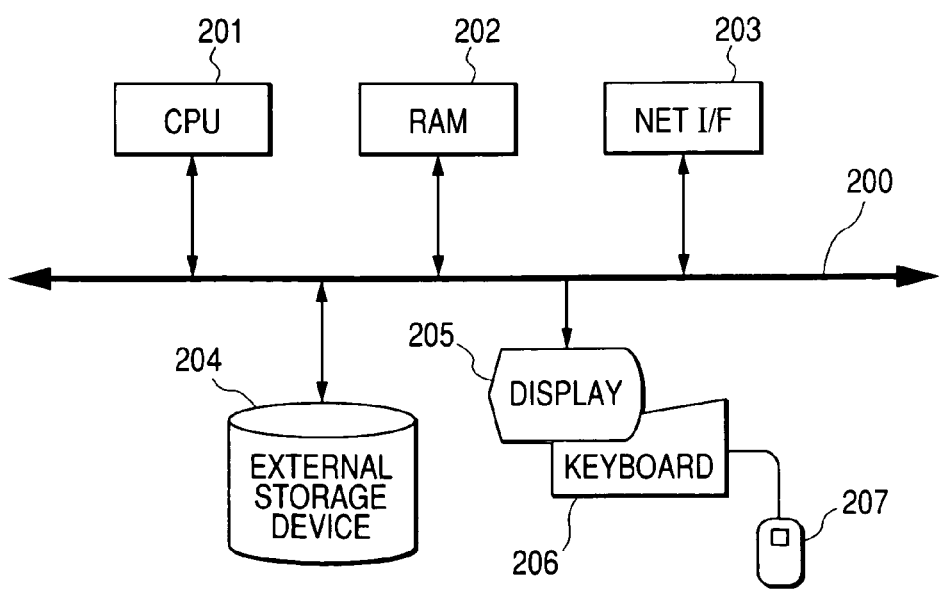

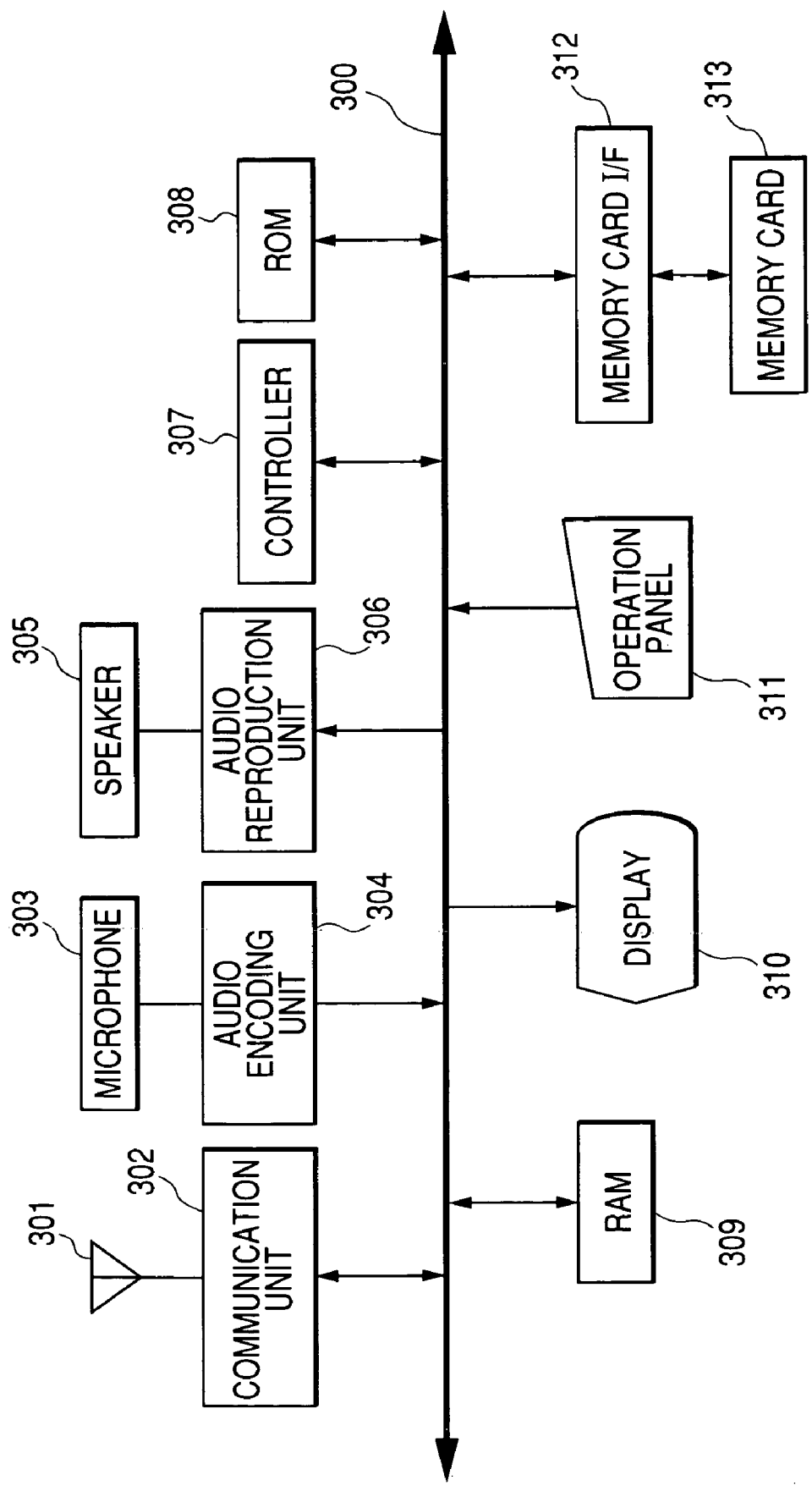

FIG. 8

TEMPLATE DATABASE 402

| ITEM CODE 801 | TEMPLATE CODE 802 | NUMBER OF REPEAT (V * H) 803 | |
|---|---|---|---|
| SEAL 1 | FRAME 1 | 4*4 | 8001 |
| SEAL 2 | FRAME 2 | 1*1 | 8002 |
| SEAL 3 | FRAME 3 | 4*4 | 8003 |

| TEMPLATE CODE 811 | NUMBER OF TEMPLATE PIXELS (HORIZONTAL (H)) 812 | NUMBER OF TEMPLATE PIXELS (VERTICAL (V)) 813 | STORAGE LOCATION 814 | |
|---|---|---|---|---|
| FRAME 1 | 120 | 160 | /template/temp1 | 8101 |
| FRAME 2 | 600 | 800 | /template/temp2 | 8102 |
| FRAME 3 | 120 | 160 | /template/temp3 | 8103 |

| TEMPLATE CODE 821 | START POSITION 822 | STANDARD NUMBER OF COMPOSED IMAGE PIXELS (H) 823 | STANDARD NUMBER OF COMPOSED IMAGE PIXELS (V) 824 | MINIMUM NUMBER OF COMPOSED IMAGE PIXELS (H) 825 | MINIMUM NUMBER OF COMPOSED IMAGE PIXELS (V) 826 | |
|---|---|---|---|---|---|---|
| FRAME 1 | 10, 10 | 100 | 140 | 80 | 112 | 8201 |
| FRAME 2 | 10, 10 | 580 | 780 | 500 | 665 | 8202 |
| FRAME 3 | 10, 10 | 100 | 140 | 80 | 112 | 8203 |

IMAGE COMPOSITION POSITION DESIGNATION DATABASE

| OPERATION CODE | OPERATION KEY | IMAGE REFERENCE POSITION | |
|---|---|---|---|
| COMPOSITION POSITION DESIGNATION | 1 | LEFT UPPER | 9011 |
| COMPOSITION POSITION DESIGNATION | 2 | MIDDLE UPPER | 9012 |
| COMPOSITION POSITION DESIGNATION | 3 | RIGHT UPPER | 9013 |
| COMPOSITION POSITION DESIGNATION | 4 | LEFT MIDDLE | 9014 |
| COMPOSITION POSITION DESIGNATION | 5 | MIDDLE MIDDLE | 9015 |
| COMPOSITION POSITION DESIGNATION | 6 | RIGHT MIDDLE | 9016 |
| COMPOSITION POSITION DESIGNATION | 7 | LEFT LOWER | 9017 |
| COMPOSITION POSITION DESIGNATION | 8 | MIDDLE LOWER | 9018 |
| COMPOSITION POSITION DESIGNATION | 9 | RIGHT LOWER | 9019 |
| INITIALIZATION | 0 | CENTER | 9020 |
| IMAGE REDUCTION | * | CENTER ON CURRENT POSITION | 9021 |
| IMAGE ENLARGEMENT | # | CENTER ON CURRENT POSITION | 9022 |

404
PRINT BASE MANAGEMENT DATABASE

| PRINT BASE CODE (1001) | BASE NAME (1002) | BASE CLASSIFI-CATION (1003) | SEVER COMPOSITION DESIGNATION (1004) | |
|---|---|---|---|---|
| 1 | BASE 1 | DELIVERY | NO | ~10011 |
| 2 | STORE | RECEIVE | YES | ~10012 |
| .... | .... | .... | .... | |

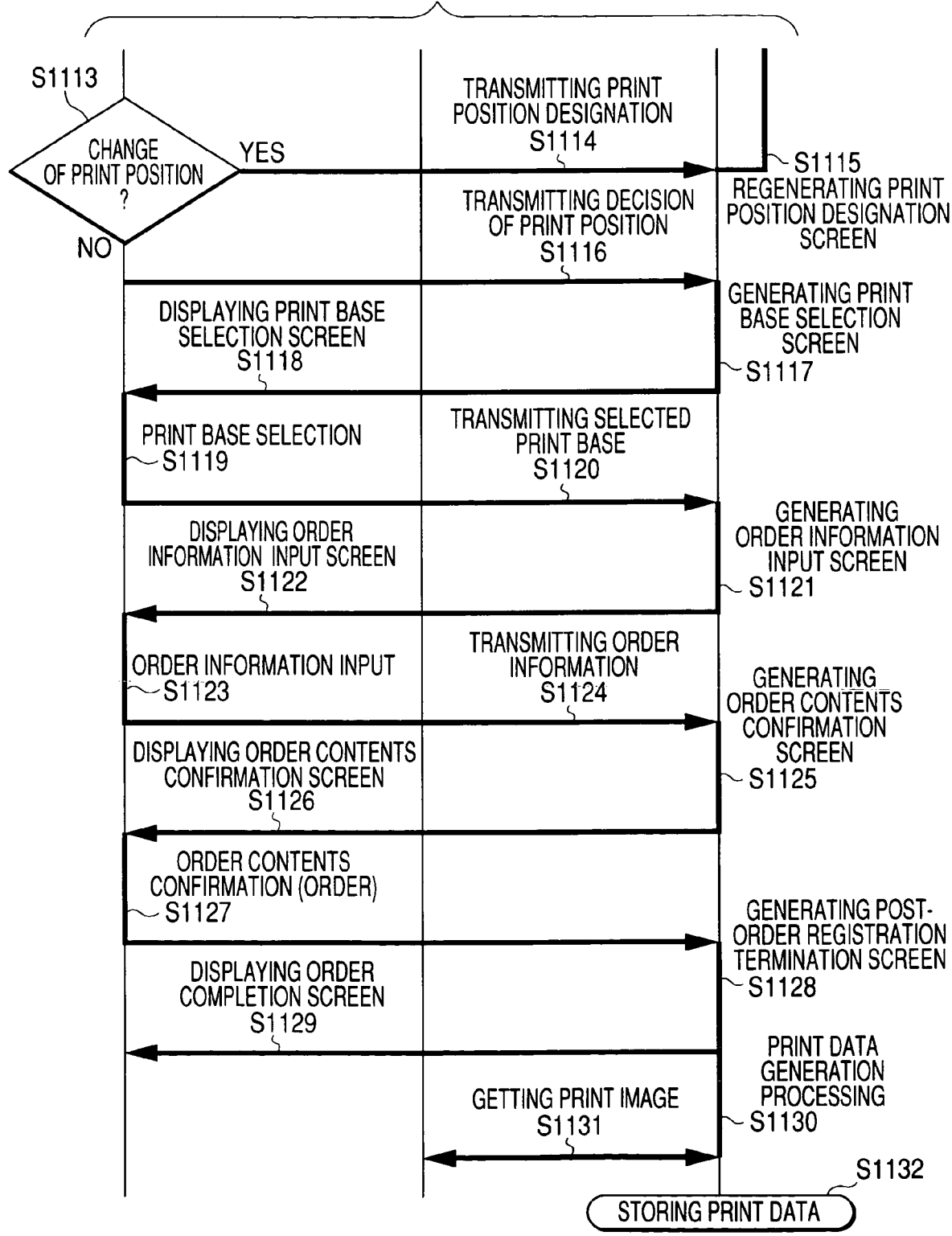

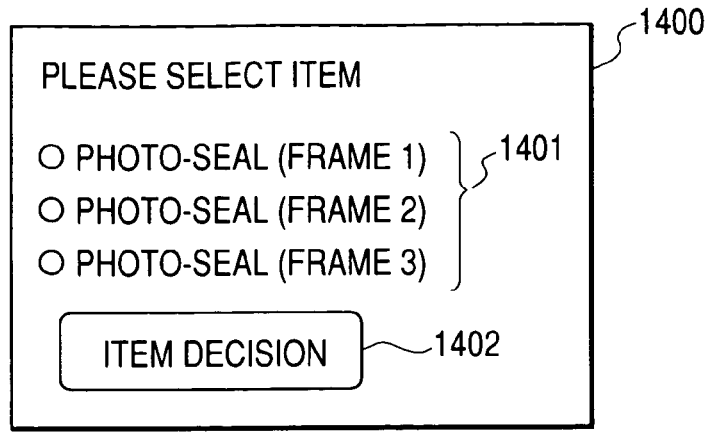
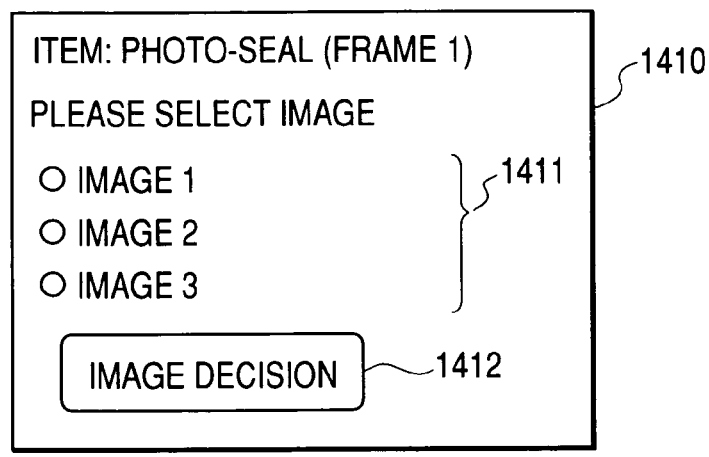
FIG. 14
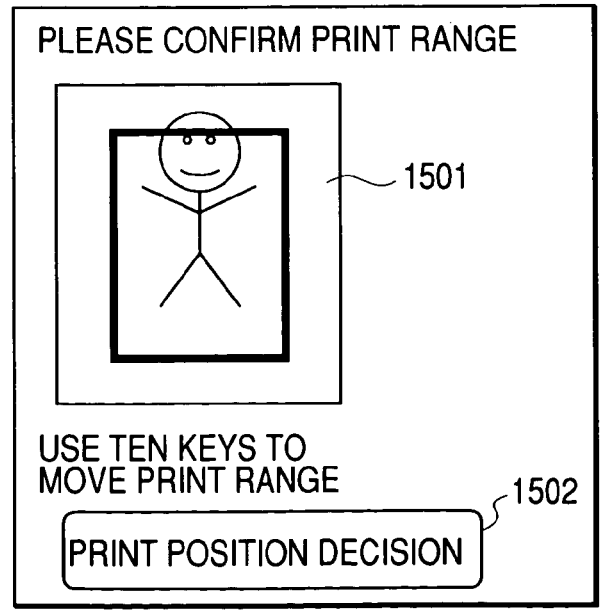
FIG. 15

SERVER APPARATUS FOR OUTPUTTING COMPOSED IMAGE INCLUDING COMPOSED CONTENTS SUCH AS IMAGE AND DOCUMENT IN TEMPLATE, CONTROL METHOD THEREFOR, PROGRAM FOR EXECUTION THEREOF BY COMPUTER, AND COMPUTER READABLE STORAGE MEDIUM STORING THE PROGRAM

BACKGROUND OF THE INVENTION

1. Field of the Invention

The present invention relates to a server apparatus to be used when a user client requests an output of a composed image, in which contents such as an image and a document are composed in a template provided by an output provider, to the server apparatus, a control method therefore, a program for execution thereof by a computer and a computer readable storage medium storing such program.

2. Related Background Art

Recently, there is made available a service in which a user can order, from a client terminal, a printing of a document or an image through the internet to a printing provider. Also as the client terminal for sending an order to the printing provider, a small portable terminal station such as a cellular phone is also being utilized.

Also there is available a service in which a document or an image transmitted from the client terminal is composed in a frame provided by the printing provider.

In case the client terminal is a personal computer equipped with a pointing device such as a mouse, it is easy to designate a position or a printing range of a document or an image within a frame, or a size change such as an enlargement or a reduction. However, as a small portable terminal station lacks such sufficient manipulating system, it is difficult for the user to achieve an operation for composing the frame with a document or an image as intended.

Also, in contrast to the personal computer which is often connected to the internet through a communication channel of a large transmission capacity, the small portable terminal station generally has a limited transmission capacity, so that a complex designation of a position, a printing range or a size requires a large transmission data amount, resulting in a drawback of an elevated communication cost.

Also, as the frame is not limited to a rectangular shape but is often a pattern constituted of a circle or arbitrary curves, there is encountered a drawback that a position of composition is more difficult to designate with a small portable terminal station with a poor manipulating system.

SUMMARY OF THE INVENTION

The present invention has been made in consideration of the foregoing drawbacks, and an object thereof is to enable, when a user orders a printing of a composed image in which an image and a document are composed in a frame provided by a printing provider, with a communication terminal not equipped with a sufficient operation system, an easy designation of a position of composing an image or a document with the frame.

Another object of the present invention is to enable, when a user orders a printing of a composed image in which an image and a document are composed in a frame provided by a printing provider, with a communication terminal not equipped with a sufficient manipulating system, an easy designation of a size change such as an enlargement or a reduction of an image or a document to be composed with the frame.

Still another object of the present invention is to enable an easy designation of a position of composing an image or a document with the frame even when the frame has a rectangular shape or a curved shape.

The aforementioned objects can be attained, according to one aspect of the present invention, by a control method for a server apparatus capable of communication with a client terminal through a network, the method comprising:

a table storage step of storing, in a memory, a table indicating a correspondence between a composing position of contents to be composed relative to composing area information and numeral keys equipped with the client terminal;

a composing area information providing step of providing said client terminal with information relating to the composing area;

a contents information receiving step of receiving information relating to the content to be composed with the composing area from the client terminal;

a numeral key information receiving step of receiving information on a numeral key designated by the client terminal; and a composed contents output step of generating a composed image, on the basis of the received numeral key information and a corresponding composing position of contents, from contents indicated by the received contents information and the provided composing area, and outputting the generated composed image.

According to another aspect of the present invention, a server apparatus of the present invention, capable of communication with a client terminal through a network, comprising:

a table storage means which stores, in a memory, a table indicating a correspondence between a composing position of contents to be composed relative to composing area information and numeral keys equipped with the client terminal;

a composing area information providing means which provides the client terminal with information relating to the composing area;

a contents information receiving means which receives information relating to the contents to be composed with the composing area from the client terminal;

a numeral key information receiving means which receives information on a numeral key designated by the client terminal; and a composed contents output means which generates a composed image, on the basis of the received numeral key information and a corresponding composing position of contents, from contents indicated by the received contents information and the provided composing area, and outputs the generated composed image.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a configuration of a printing system according to an embodiment of the present invention;

FIG. 2 is a block diagram showing a configuration of a print order accepting server and an album server according to an embodiment of the present invention;

FIG. 3 is a block diagram showing a hardware configuration of a portable terminal station according to an embodiment of the present invention;

FIG. 8 is a view showing a data configuration and a record content of a template database according to an embodiment of the present invention;

FIG. 9 is a view showing a data configuration and a record content of a merchandise information database according to an embodiment of the present invention;

FIG. 10 is a view showing a data configuration and a record content of a print base management database according to an embodiment of the present invention;

FIG. 14 is a view showing an example of display of an item selecting image and an image selecting image according to an embodiment of the present invention;

FIG. 15 is a view showing an example of display of a print position designating image according to an embodiment of the present invention;

DETAILED DESCRIPTION OF THE PREFERRED EMBODIMENTS

Figure 4:
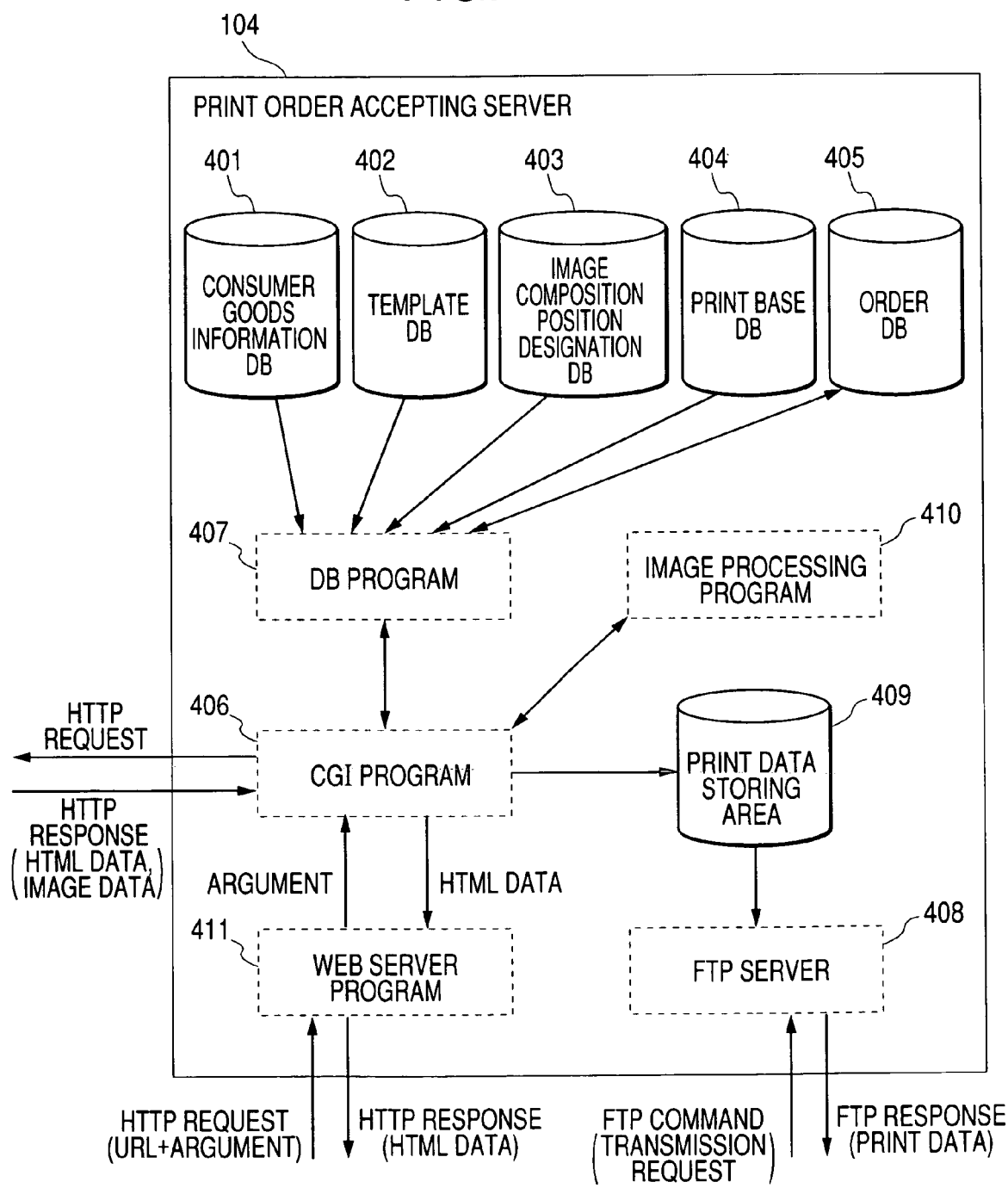
FIG. 4 is a block diagram showing a module configuration of the print order accepting server according to an embodiment of the present invention.

In the following, an embodiment of the present invention will be explained with reference to the accompanying drawings.

In this embodiment, there will be explained a case where an object to be composed with a composing area (frame) is an image, but the present invention is likewise applicable to a document or an object constituted of an image and a document, instead of an image.

At first reference is made to FIG. 1 for explaining the entire configuration of a printing system of the present embodiment. In the present embodiment, there will be explained a case where a cellular phone 101 is used for placing a printing order to a print order accepting server 104 connected to a network 106.

FIG. 1 is a block diagram showing a configuration of a printing system of the present embodiment.

Referring to FIG. 1, portable terminal stations 101a-101n such as cellular phones, which are used for executing a print ordering operation. Usually, the portable stations 101a-101n are owned by one unit for each print ordering person. In the present embodiments, there are thus provided a plurality of the microwaves 101a-101n. However, the portable terminal stations may be provided in any arbitrary number. In the following description, in case any one of the portable terminal stations 101a-101n is not specifically designated, the portable terminal station 101a-101n may be expressed as the portable terminal station 101 according to the need.

A base station 102 executes a wireless communication with the portable terminal station 101 and is connected with an internet 106 to be explained later. The portable terminal station 101 is connected with the internet 106 through the base station 102.

An album server 103 which stores images provides an image browsing function to the portable terminal station 101. In addition, the album server 103 provides the portable terminal station 101 with an image for realizing a print order starting request to a print order accepting server 104 to be explained later. Furthermore, the album server 103 provides the print order accepting server 104 with a preview image and a print image to be viewed by the operator of the portable terminal station 101.

A print order accepting server 104 receives a print order starting request from the portable terminal station and provides the portable terminal station 101 with a print order accepting service on the basis of the received print order starting request.

Print servers 105a-105n execute printing of a print order accepted by the print order accepting server 104. In the following description, in case any one of the print servers 105a-105n is not specifically designated, the print servers 105a-105n may be expressed as the print server 105.

The print server 105 is installed in a store where the operator of the portable terminal station 101 receives a print, and may also be installed in a factory or the like which executes a large amount of printing. Also the print servers 105 include at least one of a server capable of printing all the goods processed by the print order accepting server 104 and a server capable of printing only a part of the goods.

An internet 106 mutually connect the base station 102, the album server 103, the print order accepting server 104 and the print server 105.

In the present embodiment, the internet 106 is employed for mutually connecting the base station 102, the album server 103, the print order accepting server 104 and the print server 105, but another network may be employed instead of the internet 106, as long as it is capable of data exchange through a network interface of a computer apparatus.

Structure of Computer Apparatus

FIG. 2 is a block diagram showing a configuration of the print order accepting server 104 and the album server 103.

200 denotes a system bus group. In the following description, the system bus group 200 is simply represented as a system bus 200.

The system bus 200 constitutes a transmission path for mutually connecting units 201-207, to be explained later, arranged in a housing of an information processing apparatus, and for transmitting data and control information among the units 201-207.

201 denotes a CPU for controlling the entire apparatus according to a control program stored in a RAM 202.

202 denotes an internal storage apparatus such as a RAM, which stores a control program for a process to be executed by the CPU 201 and also a document, an image etc.

203 denotes a network interface (net I/F) for a connection with the network such as the internet 106 under the control by the CPU 201 thereby enabling data exchange with an unillustrated external apparatus.

204 denotes an external storage apparatus such as a magnetic disk for storing files.

There are also provided a display 205, a keyboard 206 and a pointing device 207 such as a mouse.

The control program stored in the RAM 202 executes a predetermined operation, utilizing if necessary a function of an OS (manipulating system) also stored in the RAM 202. More specifically, the control program causes data to be temporarily stored in the RAM 202 and to read the content of thus temporarily stored data. In addition, the control program writes a file in the external storage apparatus 204 and read the content of the written file. Further, the control program executes data exchanges with the unillustrated external apparatus through the network interface 203, a reception of an input from the keyboard 206 or the pointing device 207, and a display of predetermined information on the display 205.

The control program, instead of being stored in the RAM 202, may be stored in the external storage apparatus 204 and read there from for execution. Also the control program may be received and executed through the network interface 203. Furthermore, the control program may be read and executed from a read-only internal storage such as a ROM.

Also the print order accepting server 104 and the album server 103 may be provided, in addition to or in place for the keyboard 206 or the pointing device 207, with another input device such as an audio input device. However, all these components need not necessarily be provided. For example the display 205 may be dispensed with in the print order accepting server 104 or the album server 103. Also the keyboard 206 or the point device 207 may be shared in common with another computer apparatus.

The computer apparatus employed in the print server 105 is constituted by connecting a printer to a computer apparatus shown in FIG. 2. Stated differently, the print server 105 may have a configuration equivalent to that shown in FIG. 2 except for a connection of a printer. It is possible to achieve data exchange between the portable terminal station 101 and the base station 102 by providing the base station 102 with a wireless transmission-reception apparatus including the structure shown in FIG. 2 and by connecting such wireless transmission-reception apparatus with the base station 102 through the network 106. In the present embodiment, the base station 102 may have any structure as long as the portable terminal station 101 is connected with the internet 106 and is capable of data exchange with the print order accepting server 104 and the album server 103, so that a detailed description will be omitted.

Structure of Portable Terminal Station

FIG. 3 is a block diagram shown an example of a hardware configuration of the portable terminal station 101.

300 denotes a system bus group. In the following description, the system bus group 300 is simply expressed as a system bus 300.

The system bus 300 constitutes a transmission path for mutually connecting units 301-307, to be explained later, provided in the portable terminal station 101, and for transmitting data and control information among the units 301-307.

301 denotes an antenna for transmitting and receiving data or the like as a wireless signal to and from the base station 102.

302 denotes a communication unit for demodulating the wireless signal from the antenna 301 to transmit the signal to the system bus 300 and for modulating the data from the system bus 300 to supply the data to the antenna 301.

303 denotes a microphone for fetching an audio signal or the like based on a voice emitted by the user when used as a cellular phone.

304 denotes an audio encoding unit for converting the audio signal entered from the microphone 303 into a digital signal.

305 denotes a speaker for outputting audio data based on a voice emitted at a destination when used as a cellular phone or music data downloaded by connection with the internet 106.

306 denotes an audio reproduction unit for reproducing audio data and music data received through the communication unit 302. Since the audio data and music data received through the communication unit 302 are a digital signal, the audio reproduction unit 306 executes reproduction by converting the audio data and the music data into an analog signal.

307 denotes a controller for controlling units of the portable terminal station 101 through the system bus 300.

308 denotes a ROM for storing a program and the like to be executed by the controller 307.

309 denotes a ROM for storing a program and the like to be executed by the controller 307.

310 denotes a display for displaying a document or an image according to an instruction of the controller 307.

311 denotes an operation panel of the portable terminal station 101, to be operated by the operator.

312 denotes a memory card interface for connecting a memory card 313, to be explained later, to the system bus 300 thereby enabling the use thereof in the same manner as the RAM 309 or as an external storage unit. In the following description, the memory card interface 312 may be expressed as a memory card i/f 312.

313 denotes a memory card detachable from the portable terminal station 101 and usable for storing data such as a document or an image and a program or the like to be executed by the controller 307.

The present embodiment may also be realized by omitting the memory card i/f 312 and a memory card 313. Also the portable terminal station 101 may be so constructed without the function as a cellular phone and specialized for the connecting function to the internet 106.

Furthermore, portable terminal station 101 may be provided with an image pickup unit and an image encoding unit and provided with additional functions such as a still or moving image pickup function.

Module Structure of Print Order Accepting Server

In the following, there will be explained the structure of logic blocks (modules) of the print order accepting server. FIG. 4 is a block diagram showing an example of the module configuration of the print order accepting server 104.

104 denotes a print order accepting server in the present embodiment, which is identified for example by a domain name "www.server.jp" on the internet 106.

401, 402, 403, 404 and 405 denote databases, which are constructed on an external storage apparatus 204 of the print order accepting server 104, and access bases which are managed and accessed by a database program (DB program) 407 to be explained later.

407 denotes a database program (DB program) stored in the RAM 202. The databases 401-405 are an assembly of tables logically constructed by the data program 407 in files of the external storage apparatus 204. Also an arbitrary program stored in the RAM 202 is rendered capable of accessing to a record (table element) in the table. The access means a process such as addition of a record to the table, deletion of a record from the table, a search on the record in the table etc.

401 denotes a goods information database (goods information DB) storing print product information. 402 denotes a template database (template DB) which manages template data including for example a photo frame or the like for realizing a print product. 403 denotes an image composition position designating database (image composition position DB) storing data for controlling an image composing position on the template. 404 denotes a print base management database (print base DB) for managing the print server 105. 405 denotes an order database for storing the content of an accepted order.

411 denotes a web server program stored in the RAM 202. The web server program 411 receives an HTTP (hypertext transfer protocol) request from the internet 106 through the network interface 203. Also it transmits an HTTP response, containing HTML (hypertext markup language) data as a body, to the internet 106 through the network interface 203.

For the HTML data used for transmission to the portable terminal station 101, a set of format for the portable terminal station is often employed. Such set of format for the portable terminal station employs a part of regulations defined in W3C (world wide web consortium), together with a format for the portable terminal station 101, such as an activation of the telephone function.

As an example, the aforementioned HTML data are constituted based for example on a regulation such as CHTML (compact HTML). In the following description of the present embodiment, an expression HTML data or HTML document means HTML data or an HTML document adopting the regulations for the portable terminal station 101 such as the aforementioned CHTML unless otherwise stated.

406 denotes a CGI (common gateway interface) program group stored in the RAM 202. In the present embodiment, it may also be called a CGI program 406. Each program is identified by a CGI program name. The CGI program 406 is in conformity with the CGI interface and so functions as to enter an argument of the HTTP request and outputs a body of the HTTP response.

In the present embodiment, the CGI program 406 is simply assumed as a program on the RAM 202, but it can also be a servlet JSP (Java (R) server pages) functioning on a J2EE (Java (R) 2 enterprise edition) server, an ASP (active server pages) functioning on IIS (internet information server), or a script described in a script language such as Perl, and therefore may assume any form in realizing the present invention.

408 denotes an FTP (file transfer protocol) server to which the printer server 105 requests connection and which acquires order data of an accepted print order. In the present embodiment, the transmission and the reception of the print data between the print server 105 and the print order accepting server 104 are assumed to be executed by FTP, but the present invention can also be realized by another means such as HTTP data transfer as long as the transmission and the reception of the print data are possible.

409 denotes a print data storage area for storing data necessary for executing a printing in the print server 105 based on a print order accepted in the print order accepting server 104.

410 denotes an image processing program to be called by the CGI program 406 for executing an image composing process or storing a result of such composition as an image file. In the present embodiment, the image processing program 410 is a program having an independent execution unit, but, in realizing the present invention, the image processing program may be provided as a function in the CGI program.

The HTTP request employed in the present embodiment is transmitted in a format constituted of a URL (uniform resource locator) and an associated argument, from the portable terminal station 101 to the print order accepting server 1045 through the internet 106. The URL is principally divided into a protocol part, an address part and a path name part. For example, in case the URL is "http://www.server.jp/cgi/psp", the protocol part is "http://", the address part is "www.server.jp" and the path name part is "/cgi/psp". The accompanying argument is constituted of a pair of "argument name=value" divided by "&". For example, in case of "id=30&pass=abc", a first argument has a name "id" and a value "30", and a second argument has a name "pass" and a value "abc". An argument designating method varies depending on whether a method of the HTTP request is GET or POST, and, in case of GET, the argument is designated after "?" following the URL path name, while, in case of POST, the argument is designated in the body of the HTTP request.

A request is mainly divided into a static request and a dynamic request. A static request causes the web server request 411 to transmit a file content on the external storage apparatus 204 as HTML data. A file to be transmitted is determined by the web server program 411 according to the path name part in the URL.

A dynamic request causes the web server program 411 to operate so as to enter the argument of the HTTP request from the CGI program 406 according to the CGI interface and transmit the output of the CGI program 406 as HTML data. In such state, the web server program 411 is rendered capable of acquiring elements (for example information on cookie and HTTP request itself) other than the argument of the HTTP request from the CGI program 406 through the environmental variable etc.

Whether the request is static or dynamic is discriminated by the web server program 411 according to the URL path name. In case the path name part starts with "/cgi/", a dynamic request is identified and a path name part after "/cgi/" is taken as a CGI program name. For example, in case the URL is "http://www.server.jp/cgi/psp", the CGI program name is identified as "psp".

The CGI program 406 can transmit an HTTP request to the internet 106 through the network interface 203, and can receive HTML data and image data as a body of the HTML response.

Module Structure of Album Server

Figure 5:
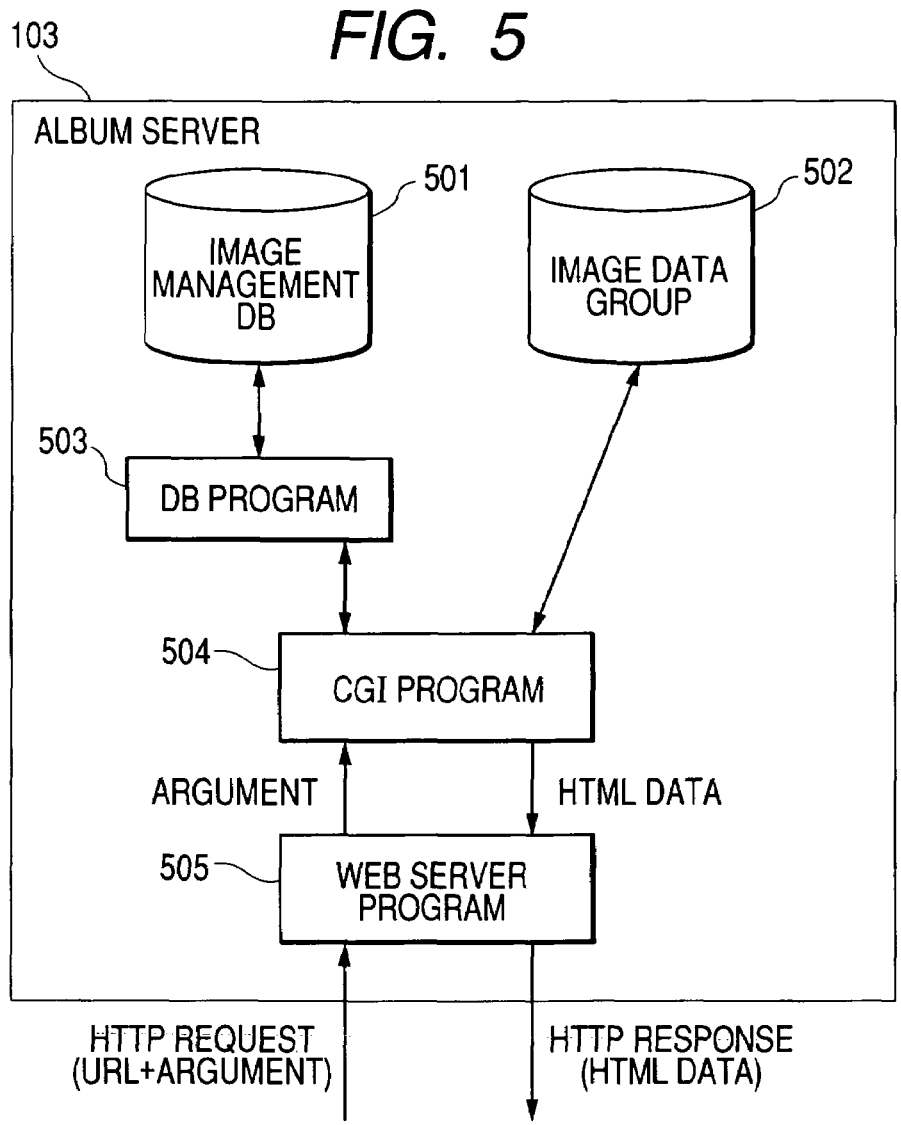
FIG. 5 is a block diagram showing a module configuration of the album server according to an embodiment of the present invention.

In the following, there will be explained the structure of logic blocks (modules) of the album server 103. FIG. 5 is a block diagram showing an example of the module configuration of the album server 103.

103 denotes an album server of the present embodiment, which is identified by a domain name "www.album.jp" on the internet 106.

501 denotes an image management database, constructed on an external storage apparatus 204 of the album server 103.

The image management database 501 is managed and accessed by a database program (DB program) 503 to be explained later, and manages a storage location of image data to be explained later.

502 denotes an image data group stored in the external storage apparatus 204, and, in the present embodiment, there are stored a preview image to be viewed by the operator of the portable terminal station 101 and a printing image to be used for printing.

503 denotes a database program stored in the RAM 202, and provides a function equivalent to that of the database program in the print order accepting program 407.

504 denotes a CGI program which retrieves image management information, stored in the image management database 501, on the basis of a request from the portable terminal station 101. Based on the result of retrieval, it acquires an appropriate image from the image data group 502, stores it in a temporary storage area provided in the external storage apparatus 204, writes its location into an HTML document and transmits it to the internet 106 through a web server program 505. In addition, the CGI program 504 executes generation and transmission of an HTML document for realizing a print request, to the print order accepting server 104 in response to a request from the portable terminal station 101, and transmission of a preview image and a printing image in response to a request from the print order accepting server 104.

505 denotes a web server program stored in the RAM 202, which receives an HTTP (hypertext transfer protocol) request from the internet 106 through the network interface 203, and transmits an HTTP response containing HTML (hypertext markup language) data as a body to the internet 106 through the network interface 203.

Module Structure of Portable Terminal Station

In the following, a module configuration of the portable terminal station 101 will be explained with reference to FIG. 6.

Figure 6:
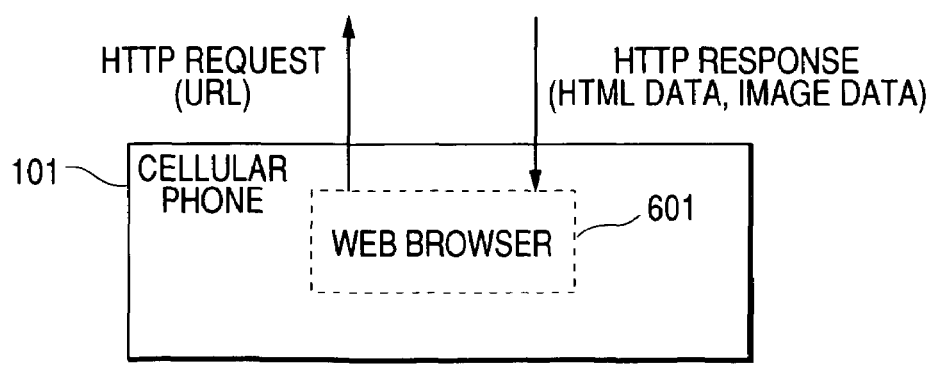
FIG. 6 is a block diagram showing a module configuration of the portable terminal station according to an embodiment of the present invention.

In FIG. 6, 101 denotes a portable terminal station to be employed in the present embodiment.

601 denotes a web browser program stored in a ROM 308 or a RAM 309. When the operator enters a URL to be browsed utilizing an operation panel 311, the web browser program 601 executes a wireless communication with the base station 102 through the communication unit 302 and the antenna 301, and transmits the HTTP request containing the entered URL to the internet 106.

Also in synchronization with the transmission of the HTTP request, the web browser program 601 receives a corresponding HTTP response from the internet 106. The web browser program 601 can display the HTML data constituting the body of the received HTTP response and image data, on a display 310.

In the foregoings, there have been explained the entire configuration of the present embodiment and the hardware and module structures of the servers and terminals.

Data in Print Order Accepting Server

In the following a data structure in the print order accepting server 104 will be explained.

Goods Information Database

Figure 7:
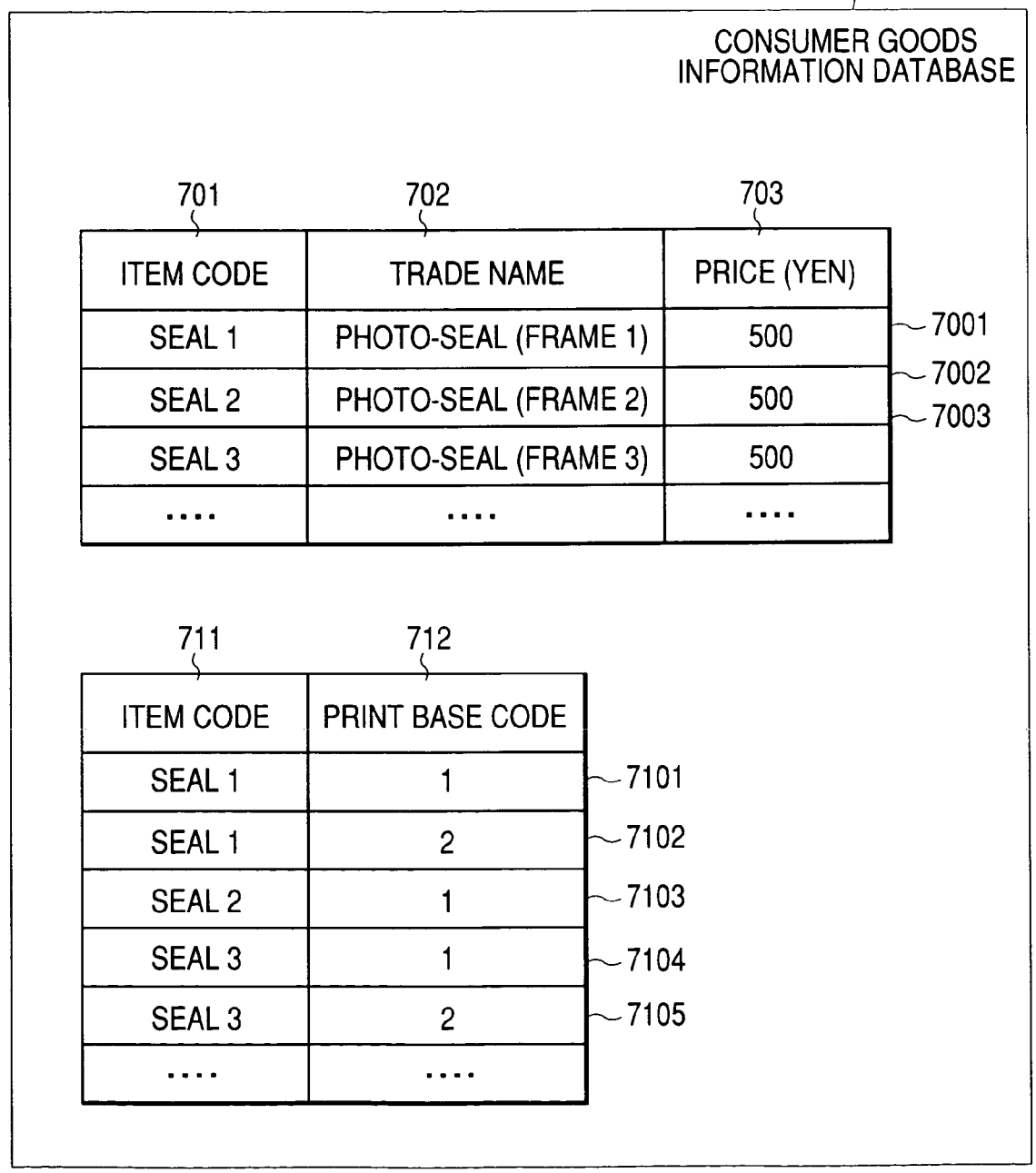
FIG. 7 is a view showing a data configuration and a record content of a goods information database according to an embodiment of the present invention.

At first a data structure of the goods information database 401 will be explained with reference to FIG. 7. In FIG. 7, a table constituting one record with an item code 701, a trade name 702 and a price 703 is a goods table for managing selling items and selling prices. A table constituting one record with an item code 711 and a print base code 712 is a goods output location table for managing print bases capable of outputting the selling items.

701 denotes an item code representing an item to be sold by using a unique code in the print order accepting server 104. The ordered item is informed in a form of the item code 701 to the print server 105.

702 denotes a data area storing a trade name to be displayed on the portable terminal station 101.

703 denotes a price for managing the selling unit price of the sold item.

7001, 7002 and 7003 show examples of a goods record of the present embodiment. In the goods record 7001, there are registered an item code 701 of "Seal 1", a trade name 702 of "Photo-seal (Frame 1)" and a price 703 of "500". The record indicates that the item code 701 is "Seal 1", the trade name 702 is "Photo-seal (Frame 1)" and the price 703 is "500".

Similarly, the item record 7002 indicates that the item code 701 is "Seal 2", the trade name 702 is "Photo-seal (Frame 2)" and the price 703 is "500". Also the item record 7003 indicates that the item code 701 is "Seal 3", the trade name 702 is "Photo-seal (Frame 3)" and the price 703 is "500".

711 is equivalent to the item code registered in the item code 701.

712 denotes a print base code for specifying a print server 105 capable of outputting the item specified by the item code 711, and stores a code for uniquely specifying the print server 105.

7101-7105 are examples of the item output location records of the present embodiment.

An item output location record 7101 represents that the item code 711 is "Seal 1" and the print base code 812 is "1". It indicates that an item having an item code 711 of "Seal 1" can be outputted by a print server 105a specified by a print base code "1".

An item output location record 7102 indicates that an item having an item code 711 of "Seal 1" can be outputted by a print server 105b specified by a print base code "2".

Similarly, an item output location record 7103 indicates that an item having an item code 711 of "Seal 2" can be outputted by the print server 105a, an item output location record 7104 indicates that an item having an item code 711 of "Seal 3" can be outputted by the print server 105a, and an item output location record 7105 indicates that an item having an item code 711 of "Seal 3" can be outputted by the print server 105b.

The print server 105 and the print base code 712 are correlated in the print base database 404 as will be explained later with reference to FIG. 10.

Template Database

FIG. 8 is a view showing an example of data structure of the template database 402 and the record content in the present embodiment.

In FIG. 8, a table constituting one record with an item code 801, a template code 802 and a repeating number 803 is a used template table storing a template to be used for the item to be sold in the print order accepting server 104 and an arrangement in case templates are arranged in a tile-like manner for the sold item.

A table constituting one record with a template code 811, a horizontal side pixel number 812 of template, and a vertical side pixel number 813 of template, and a storage location 814 is a template management table for storing a pixel number of the template data and a storage position of the template data in the external storage apparatus 204.

A table constituting one record with a template record 821, an image start position 822, a standard horizontal side number 823 of composed image pixels, a standard vertical side number 824 of composed image pixels, a minimum horizontal side number 825 of composed image pixels, and a minimum vertical side number 826 of composed image pixels, is a composed image size table for storing an image area in the template, a standard pixel number in the image composition, and a lower limit of the pixel number for ensuring a print quality at the image composition.

801 is an item code equivalent to the item code 701, 711 in the goods information database 401.

802 denotes a template code storing a template code for uniquely specifying the template handled in the print order accepting server 104.

803 is a number of repetition, representing an arrangement of the template specified by the aforementioned template code for forming an item to be sold. In the present embodiment, the templates are arranged in a tile-like manner. The repetition number 404 is represented, for example in case of arranging a same template 16 times in 4 rows in the vertical side and in 4 columns in the horizontal side, by a format of vertical*horizontal, such as "4*4".

In the present embodiment, the repetition number in the vertical side and that in the horizontal side are stored in a same column, but it is also possible to store these numbers in separate columns. Also a dividing symbol "*" may naturally be replaced by another symbol.

8001-8003 show examples of the records of the used template table. A record 8001 indicates that an item specified by an item code 801 of "Seal 1" employs a template specified by "Frame 1" and such template is used in an arrangement of 4 rows in the vertical side and 4 columns in the horizontal side.

Similarly a record 8002 indicates that an item specified by an item code 801 of "Seal 2" employs a template specified by "Frame 2" and such template is used in an arrangement of 1 row in the long side and 1 column in the wide side. Stated differently, the record 8002 indicates absence of repetition. A record 8003 indicates that an item specified by an item code 801 of "Seal 3" employs a template specified by "Frame 3" and such template is used in an arrangement of 4 rows in the vertical side and 4 columns in the horizontal side.

811 denotes a template code equivalent to the template code 802 and stores a code uniquely specifying a template.

812 denotes a wide side template pixel number representing a pixel number in the horizontal side of the template represented by the template code 811.

813 denotes a vertical side template pixel number representing a pixel number in the vertical side of the template represented by the template code 811.

Each of the horizontal side template pixel number 812 and the vertical side template pixel number 813 indicates a value that does not take the repetition number 803 in consideration.

814 denotes a storage location in which the template is stored in the external storage apparatus 204.

8101-8103 show examples of template management records of the present embodiment. A record 8101 indicates that a template specified by "Frame 1" has 120 pixels in the horizontal side and 160 pixels in the vertical side, and is a file of which storage location is represented by "/template/temp1".

A record 8102 indicates that a template specified by "Frame 2" has 600 pixels in the horizontal side and 800 pixels in the vertical side, and is a file of which storage location is represented by "/template/temp2".

A record 8103 indicates that a template specified by "Frame 3" has 120 pixels in the horizontal side and 160 pixels in the vertical side, and is a file of which storage location is represented by "/template/temp3".

821 denotes a template code equivalent to the template codes 802, 811 and stores a code uniquely specifying a template.

822 denotes an image start position storing a start position of an image area in the template. The image start position 822 stores a value represented by pixel numbers taking the upper left corner of the template as a reference point. The image start position is represented by pixel numbers of vertical side and horizontal side, and, in the present embodiment, it is presented by "pixel number at horizontal side, pixel number at vertical side". It is also possible to separate the pixel number in the horizontal side and the pixel number in the vertical side in separate columns and to employ a dividing symbol different from that shown in FIG. 8.

823 denotes a standard horizontal side pixel number of composed image, representing an initial pixel number in the horizontal side of the image to be composed in the template.

824 denotes a standard vertical side pixel number of composed image, representing an initial pixel number in the vertical side of the image to be composed in the template.

The standard horizontal side pixel number 823 and the standard vertical side pixel number 824 also serve to indicate an image composition area in the template.

825 denotes a minimum horizontal side pixel number representing a limit number in the horizontal side pixels in the image to be composed in the template for ensuring a print quality.

826 denotes a minimum vertical side pixel number representing a limit number in the vertical side pixels in the image to be composed in the template for ensuring a print quality.

The values in the minimum horizontal side pixel number 825 and in the minimum vertical side pixel number 826 of the composed image correspond to a ratio of the standard horizontal side pixel number 823 and the standard vertical side pixel number 824 of the composed image, namely an aspect ratio of the image composition area, and, at the composing operation of the image with the template, the designated range is enlarged or reduced to the pixel numbers represented by the standard vertical side pixel number 823 and the standard vertical side pixel number 824. Since the print quality is usually significantly deteriorated in case of an enlargement, the values registered in the minimum horizontal side pixel number 825 and in the minimum vertical side pixel number 826 may become equal to those of the standard vertical side pixel number 823 and the standard vertical side pixel number 824.

8201-8203 show examples of records of the composition image table of the present embodiment.

A record 8201 indicates that the composition in the template specified by "Frame 1" is started from a position of 10 pixels in the horizontal side and 10 pixels in the vertical side from the upper left position, that the pixel numbers in the templates are 100 pixels in the horizontal side and 140 pixels in the vertical side, and that the minimum pixel numbers at the composition are 80 pixels in the horizontal side and 112 pixels in the vertical side.

A record 8202 indicates that the composition in the template specified by "Frame 2" is started from a position of 10 pixels in the horizontal side and 10 pixels in the vertical side from the upper left position, that the pixel numbers in the templates are 580 pixels in the horizontal side and 780 pixels in the vertical side, and that the minimum pixel numbers at the composition are 500 pixels in the horizontal side and 665 pixels in the vertical side.

A record 8203 indicates that the composition in the template specified by "Frame 3" is started from a position of 10 pixels in the horizontal side and 10 pixels in the vertical side from the upper left position, that the pixel numbers in the templates are 100 pixels in the horizontal side and 140 pixels in the vertical side, and that the minimum pixel numbers at the composition are 80 pixels in the horizontal side and 112 pixels in the vertical side.

In the foregoing there has been explained a case where the image composing area is rectangular. In case it is not rectangular, following processes can be handled in the same manner as in the rectangular case, by providing, in addition to the aforementioned data, shape information indicating a shape such as a rectangle, a circle or an oval and vector data for reproducing such shape, and by determining the image start position 822, the standard vertical side pixel number 823, the standard vertical side pixel number 824, the minimum horizontal side pixel number 825 and the minimum vertical side pixel number 826 by an imaginary rectangular area circumscribed on such shape.

Image Composition Position Designating Database

FIG. 9 shows an example of data configuration and record content of the image composition position designating database 403.

In FIG. 9, a table constituting one record with an operation code 901, an operation key 902 and a reference position 903 is an image composition position designating table for obtaining an image composition position or executing a conversion corresponding to an enlarging or reducing request of the image composition area, according to an instruction from the portable terminal station 101.

901 denotes an operation code storing a composition position designation for designating an image composing position, or a process request for an enlargement or reduction of the composition area.

902 denotes an operation key provided in an operation panel 311 of the portable terminal station 101.

903 denotes a reference position at the image composition corresponding to the operation code 901.

9011-9022 show examples of registrations of the image composition position designating record of the present embodiment. The present embodiment has 12 processes, including composition position designations for 9 image reference positions formed by combining a left, center or right position in the horizontal side of the image and an upper, center or lower position in the vertical side of the image, a reducing instruction of the composition area, an enlarging instruction of the composition area and an initializing instruction for restoring to the initial state.

A record 9011 indicates that a process is designation of a composition position and the image composition assumes a reference position at the upper left position of the image when a "1" key is selected in the operation panel 311 of the portable terminal station 101.

Also, records 9012-9019 indicate that processes are designation of composition positions and the image composition assumes reference positions stored in the image reference positions 903 respectively when "2" to "9" keys are selected in the operation panel 311 of the portable terminal station 101. The assignment of the 9 image reference positions to the "1"-"9" keys is naturally not limited to the example shown in FIG. 9.

A record 9020 indicates that a process is initialization and the content designated by the "1"-"9", "*" and "#" keys is canceled when a "0" key is selected in the operation panel 311 of the portable terminal station 101. In the present embodiment, a selection of the "0" key executes such cancellation, whereupon the reference position of the image composition is shifted to the center.

A record 9021 indicates that a process is a reduction of the composition area and a reference position is that designated immediately before when a "*" key is selected in the operation panel 311.

A record 9022 indicates that a process is an enlargement of the composition area and a reference position is that designated immediately before when a "#" key is selected in the operation panel 311.

It is also possible to invert the assignments for the "*" and "#" keys and to so construct the records 9021, 9022 as to execute an enlargement or a reduction of the composition area respectively when the "*" or "#" key is selected.

Print Base Management Database

FIG. 10 shows an example of data configuration and record content of the print base management database 404.

In FIG. 10, a table constituting one record with a print base code 1001, a base name 1002, a base classification 1003 and a server composition designation 1004 is a print base management table for managing the print server 105.

1001 denotes a print base code for uniquely specifying a print server 105.

1002 denotes a base name to be used for example in a display on the portable terminal station 101.

1003 denotes a classification of the base. In the present embodiment, the base classification 1003 stores one of a "delivery" class in case the sold item is delivered and a "reception" class in case the sold item is directly received at the store where the print server 105 is located. The base classification 1003 can be changed according to a flow of order placing screen provided to the portable terminal station 101, and may be classified, for example, by items to be handled or by a delivery term of the sold item.

1004 denotes a server composition designation indicating, in case the sold item includes a composition of a template and an image, whether the composition is executed in the print order accepting server 104. This is provided for a situation where the composition cannot be executed at the print server, for example because of a location of the print server or because of presence/absence of an operator.

10011 denotes a print base management record registered in the print base management table of the present embodiment. It represents that a print server 105 represented by a print base code "1" has a base name "Base1", and a base classification "delivery", and that a template-image composition is not executed in the print order accepting server 104.

10012 denotes a print base management record registered in the print base management table of the present embodiment. It represents that a print server 105 represented by a print base code "2" has a base name "Store", and a base classification "reception", and that a template-image composition is executed in the print order accepting server 104.

In the following description of the present embodiment, it is assumed that the print server represented by the print base code "1" is the print server 105a and the print server represented by the print base code "2" is the print server 105b.

The print base management server 404 of the present embodiment is limited to necessary minimum items but may also include other items such as a location, a telephone number, and a store operation time.

Order Database

The order database 405 stores an order code, which is uniquely specified when the operator executes a print ordering operation with the portable terminal station 101 and a print order is established, also an ordered item, an ordered number, an orderer information, an outputting print base, a price etc. The order information includes a name, a telephone number, an address etc.

Print Data Storage Area

A print data storage area 409 is provided in an area of the external storage apparatus 204, that can be written thereinto and referred to from the CGI program 406.

There is also provided a directory (hereinafter called order management area) classified by the print base code and the order code.

Such order management area stores a file necessary for printing, of which structure is different depending on the registered content of the server composition designation 1004 in the aforementioned print base management database 404. In case a composition is executed in the print order accepting server 104, there are stored an image file obtained as the result of the composition and print instruction data. The print instruction data file is a text file describing an order content stored in the order database 405. In the present embodiment, the text file is assumed to be described in XML (extensible markup language).

On the other hand, in case a composition is not executed in the print order accepting server 104, there are stored a template data file, a print image file and a print instruction data file. In case the print order accepting server 104 does not execute composition of template and image, there are described, in addition to the items stored in the order database 405, an upper left pixel position, a horizontal side pixel number and a vertical side pixel number of the image composition area as instruction for composition. In case the template data file is delivered in advance to the print server 105, the template data may be dispensed with from the order management area 409.

In the present embodiment, the composition of the template and the image in the print server 105 may be achieved in any method.

Operation Panel of Portable Terminal Station

Prior to an explanation on a print order sequence, there will be explained, with reference to FIG. 12, an example of key arrangement on an operation panel 311 provided on the portable terminal station 101a. As the operation panel 311 of the portable terminal station 101a is same in configuration as those of other portable terminal stations 101b-101n, explanation on such portable terminal stations 101b-101n will be omitted.

Figure 12:
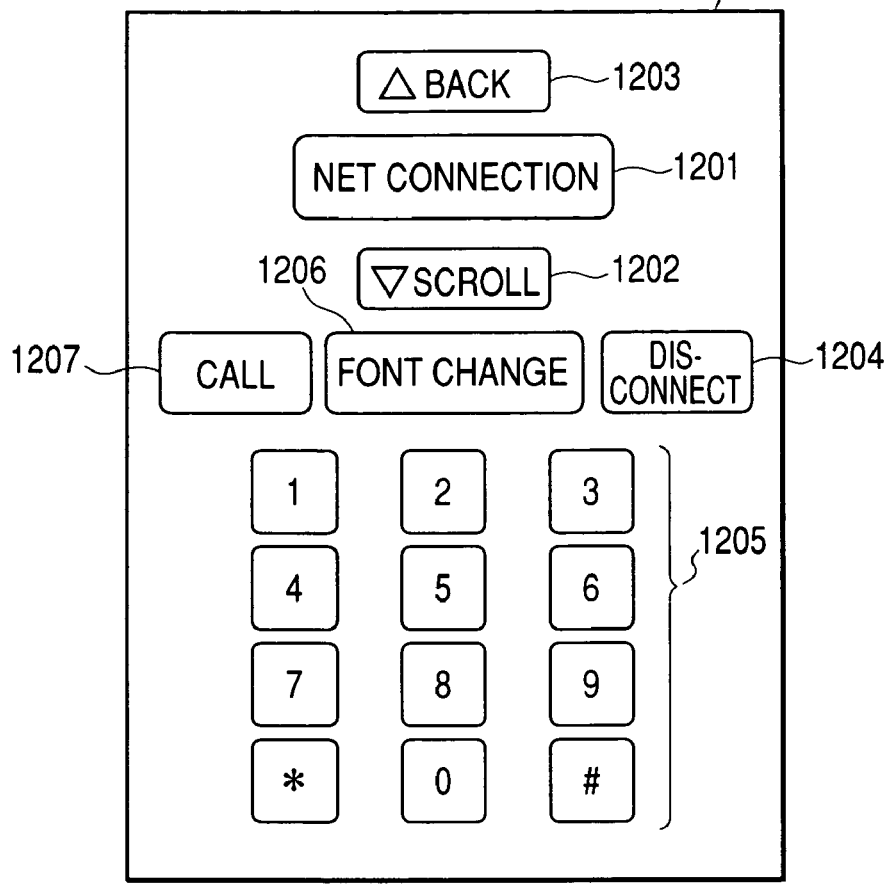
FIG. 12 is a view showing an example of key arrangement in an operation panel provided in the portable terminal station.

Referring to FIG. 12, 311 denotes an operation panel of the portable terminal station 101a.

1201 denotes an internet connection button to be depressed in case of connecting the portable terminal station 101a to the internet 106 through the base station 102. A depression of the internet connection button 1201 activates a web browser 601 stored in the ROM 308 of the portable terminal station 101a. Then the web browser interprets the HTML data received by the portable terminal station 101a and displays such data on a display 310, and the internet connection button 1201 also has a function of depressing a button described in the HTML data and determining a selection of a radio button or a check box (hereinafter operable display items being collectively called control).

1202 denotes a scroll button for scrolling the display downwards in case the HTML data displayed on the display 311 cannot be accommodated within a display area thereof. In case the HTML data include operable control items, a depression of the scroll button 1202 causes a selected state among the controls to shift in succession from the upper part of the image. A control in the selected state can be determined by a depression of the internet connection button 1201. Also a control providing an on/off binary state such as a check box changes its state by every depression of the internet connection button 1201 as in a toggle switch. Also in a control requiring plural inputs such as a text input, an input mode is assumed by a depression of the internet connection button 1201 when such control is in a selected state by the scroll button 1202. Such input mode is terminated by a re-depression of the internet connection button 1201 when a text input operation is completed.

1203 denotes a return button constituting a pair together with the scroll button 1202 and used for moving the image upwards. When the return button 1203 is depressed in an image containing controls, display of the image is scrolled upwards with successive selection of such controls.

1204 denotes a disconnection button for terminating the web browser 601, terminating the communication with the base station 102 and terminating the connection with the internet 106. In a portable terminal station having a cellular phone function, the disconnection button 1204 may also serve as a call terminating button.

1205 denotes a numeral key part. The numeral key part 1205 is used for entering a destination telephone number in the cellular telephone function. Also, when the web browser is activated and the HTML data contain a description for assigning a specified control to any of the numeral keys 1205, a depression of such numeral key has an effect of a depression of the internet connection key 1201 while the control is in the selected state. Thus, by selecting a desired control by the scroll button 1204 or the return button 1203, it is possible to reduce the number of key operations performed before the internet connection button 1201.

1206 denotes a character change button which changes a font of input characters at the character input mode. A depression of the character change button 1206 changes the font of the character entered by the depressions of the numeral keys 1205.

1207 denotes a call start button for the cellular phone function.

In the present embodiment, the call start button 1207 is not used since the portable terminal station 101 is connected to the internet 106 and utilizes the web browser 601.

Print Order Sequence

In the following there will be explained a process sequence in case the portable terminal station 101a browses images stored in the album server 103 and places a print order for an image to the print order accepting server 104, with reference to FIGS. 11A and 11B and other illustrations. Process is similar to other portable terminal stations 101b-101n, so that explanation for such other portable terminal stations 101b-101n is omitted.

Figures 11, 11A:
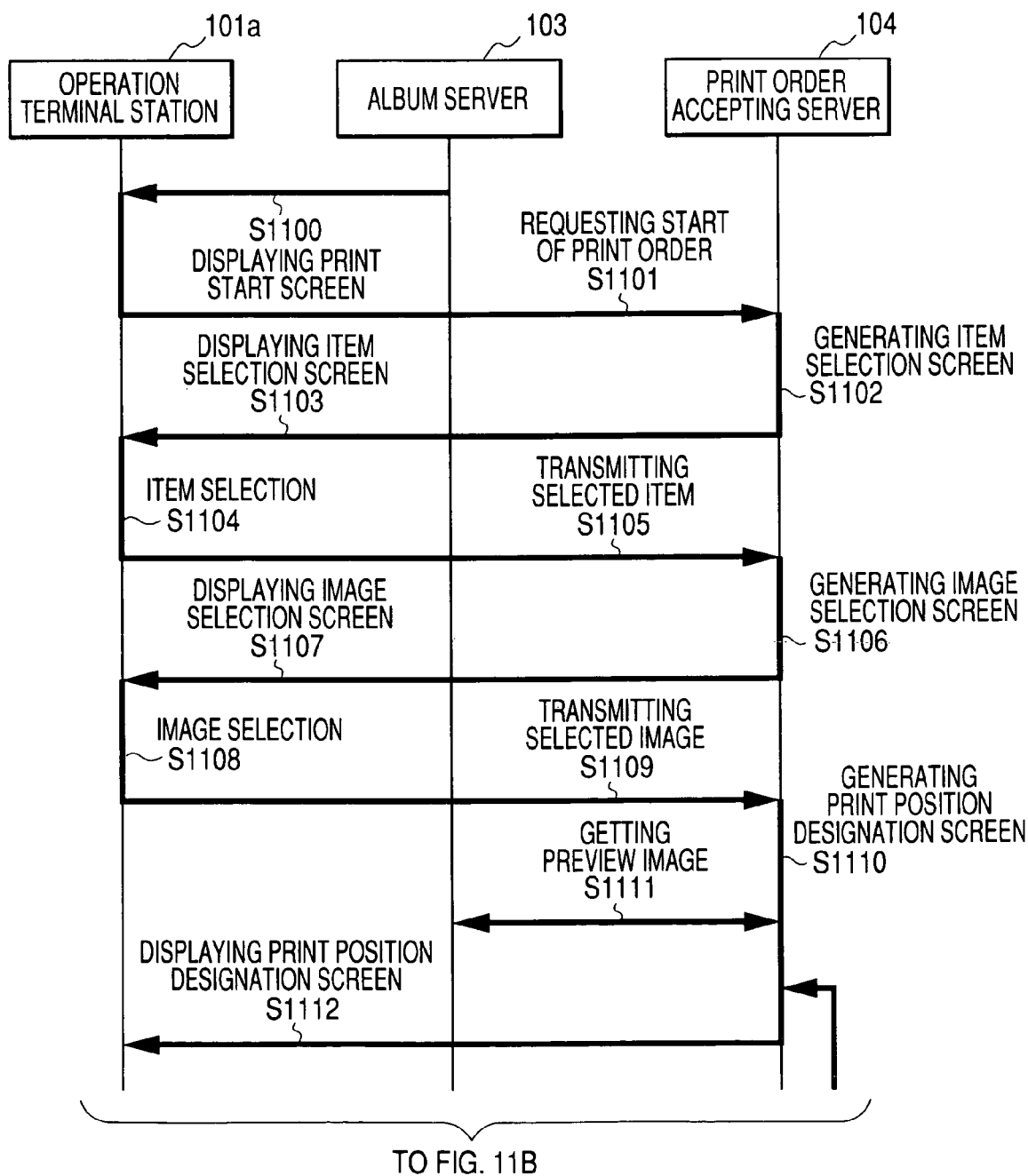
FIG. 11 is comprised of FIGS. 11A and 11B showing views of a sequence in case of ordering a print to the print order accepting server according to an embodiment of the present invention.

In the description of the sequence in FIGS. 11A and 11B, a detailed description will be omitted for a part of the sequence, in order to emphasize the feature of the present embodiment.

The sequence shown in FIGS. 11A and 11B start from a timing when the portable terminal station 101a is connected to the internet 106, sends a browse request (HTTP request) by an HTTP protocol to the album server 103, then receives browsing images and HTTP data in response to such HTTP request, then selects a candidate print image by an image selecting function in the HTTP data, transmits a print order start request to the album server 103 which thus receives such print order start request.

Up to Print Order Start (Sequences S1100-S1101)

Figure 13:
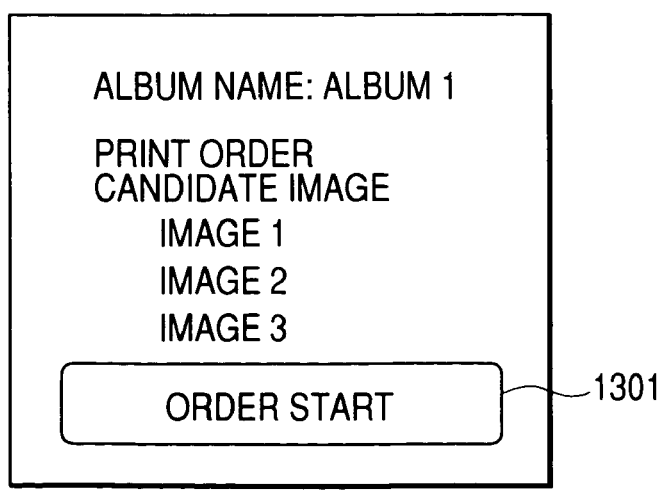
FIG. 13 is a view showing an example of display of a print start image according to an embodiment of the present invention.

In a sequence S1100, the CGI program 504 in the album server 103 is activated by a request from the portable terminal station 101a, and generates and transmits HTML data for displaying a print start image including a print order start button 1301 shown in FIG. 13, to the portable terminal station 101a.

The web browser 601 of the portable terminal station 101a displays a print start image shown in FIG. 13 on the basis of the received HTML data.

Referring to FIG. 13, 1301 denotes a print order start button, describing a URL for activating a print order accepting start program provided by the CGI program 406 of the print order accepting server 104.

In a corresponding portion of the HTML data representing the print order start button 1301, for example in case the CGI path is "/cgi" and the print order accepting start program is "ORDERSTART", a URL"http://www.server.jp/cgi/ORDERSTART" is described in a portion of requested URL in the "A" tag or "form" tag according to the HTML regulations.

In the present embodiment, an image name of the candidate print image, a pixel number of print image data of such image, a pixel number of preview image data of such image, a print data acquisition request character train constituted of a URL and an argument of the album server 103, and a preview data acquisition request character train constituted of a preview data acquisition URL and an argument of the album server 103 are described, as an argument, in a predetermined format, together with an order start URL. In the present embodiment, these descriptions are made for all the images selected by the operator as the print candidates.

Referring back to FIGS. 11A and 11B, in a sequence S1101, the operator of the portable terminal station 101a depresses the return button 1202 of the operation panel 311 to select the print order start button 1301, and depresses the internet connection button 1201, whereby the portable terminal station 101a is connected to the print order accepting server 104 and sends a print order start request thereto.

From Print Order Start to Selection of Print Image Data (Sequences S1102-S1109)

Referring to FIGS. 11A and 11B, in a sequence S1102, a print order start program, contained in the CGI program 406 of the print order accepting server 104 is activated by the print order start request transmitted in the sequence S1101.

In the print order start program, the argument described in the sequence S1101 is stored in the RAM 204. At the storage in the RAM 204, in order to retain the stored content up to the end of the sequence shown in FIGS. 11A and 11B, the sequence is regarded as an assembly (session) of serial processes, and a number (session ID) with which the session can be uniquely specified the session is assigned and is stored in correlation with the aforementioned argument.

Then records registered in the goods table in the goods information database 401 are acquired through the database program (DB program), and HMTL data for displaying an item selection image 1400 as shown in FIG. 14 are prepared and transmitted to the portable terminal station 101a. The HTML data for displaying the item selection image are so described as to display radio buttons 1401 together with item names and also display an item decision button 1402. The HTML data are also so described as to transmit a selected item code as an argument upon selection of a radio button 1401. The item decision button 1402 is described by the HTML data so as to transmit a URL for activating an image selecting CGI program for realizing a selection of the image to be printed as a next CGI program and an item code selected as the argument by the ratio button 1401. Also for specifying the session, the HTML data are so described as to also transmit the session ID assigned in the sequence S1102.

A sequence S1103 transmits the HTML data prepared in the sequence S1102 to the portable terminal station 101a.

In a sequence S1104, the portable terminal station 101a receives the HTML data prepared in the sequence S1102, and the web browser 601 displays an item selection image 1400 shown in FIG. 14. The operator operates the keys of the operation panel 311 to select a desired item and depresses the item decision button 1402.

A sequence S1105 transmits an HTTP request with the item code selected in the sequence S1104 and the session ID as the argument to the print order accepting server 104 described in the URL, in order to activate the image selecting CGI program.

In a sequence S1106, an image selecting CGI program contained in the CGI program 406 of the print order accepting server 104 is activated. The image selecting CGI program stores the item code, transmitted as argument in correlation with the session ID, in the RAM 204.

Then the image name stored in the RAM 204 in the sequence S1102 is acquired to generate HTML data for displaying an image selecting image 1410 as shown in FIG. 14. The image selecting HTML data are so described, as in the item selecting image 1400 generated in the sequence S1102, as to display image selecting radio buttons 1411 for selecting a desired image and an image decision button 1412 which describes a URL for activating a succeeding image print position CGI program.

The generated HTML data are transmitted to the internet 106.

A sequence S1107 transmits the HTML data, prepared in the sequence S1106, to the portable terminal station 101a. Thus the portable terminal station 101a receives the HTML data prepared in the sequence S1106 and the web browser 601 displays the image selecting image 1410 shown in FIG. 14.

In a sequence S1108, the operator operates the keys of the operation panel 311 to select a desired image and depresses the image decision button 1412.

In a sequence S1109, in order to activate the image print position CGI program, an HTTP request is transmitted together with the image name of the selected image and the session ID as the argument, to the print order accepting server 104.

Determination of Print Position (Sequences S110-S1111)

In a sequence S1110, the print order accepting server 104 receives the HTTP request from the portable terminal station 101a and activates the image print position CGI program contained in the CGI program 406.

The image print position CGI program at first stores the image name, received as the argument, in the RAM 204 in correlation with the session ID. Then a retrieval is made on the template database 402, utilizing the selected item code stored in the RAM 204 as a retrieval key. In this manner, through the database program 407, there is retrieved and acquired a record having a same item code stored in the item code 801 of the template database 402 as the selected item code.

Then, the template code in the used template 802 of thus acquired record is used as a retrieval key to execute a retrieval on the template management table and the composition image size table in the template database 402. Thus, there is acquired a record having same template code 811 or 821 as the template code of the retrieval key.

In the present embodiment, there will be explained, as an example, a case where the sequence S1104 selects an item of an item code "Seal 1".

Utilizing the item "Seal 1" as the retrieval key, there is obtained a used template record 8001. Since the used template record 8001 stores a template code "Frame 1", there are acquired a template management record 8101 form the template management table and a composition image size record 8201 from the composition image size table.

Then the image print position CGI program acquires, in a sequence S1111 to be explained later, a preview image corresponding to the image selected in the sequence S1108.

Then it reads out the composition image size record 8201, also reads out the pixel number of the print image and the pixel number of the preview image, corresponding to the selected image, from the RAM 204 and initiates a composition of print area preview image data for informing an image print area. The print area preview image data are, as shown in FIG. 15, a preview image 1501 in which a frame indicating a print area is composed.

Upon completion of the image composition, HTML data for displaying a print position designating image as shown in FIG. 15 are generated and transmitted together with the preview data subjected to the composition to the internet 106. In case of a failure in the image composition, an error is informed and the print process is interrupted (not shown).

A sequence S1111 acquires a preview image. The acquisition is achieved by reading out a preview data acquisition request character train, corresponding to the image selected in the sequence S1108, from the RAM 204, and transmitting an HTTP request, utilizing such preview data acquisition request character train, to the album server 103.

Based on such HTTP request, the album server 103 transmits a preview image to the print order accepting server 104. The image print position CGI program stores the preview image as an image data file in the external storage apparatus 204.

Preview Image Composition

Now, a composing process for a preview image, to be executed in the sequence S1110 and in a sequence S1115 to be explained later, will be explained with reference to a flow chart in FIG. 18.

Figure 18:
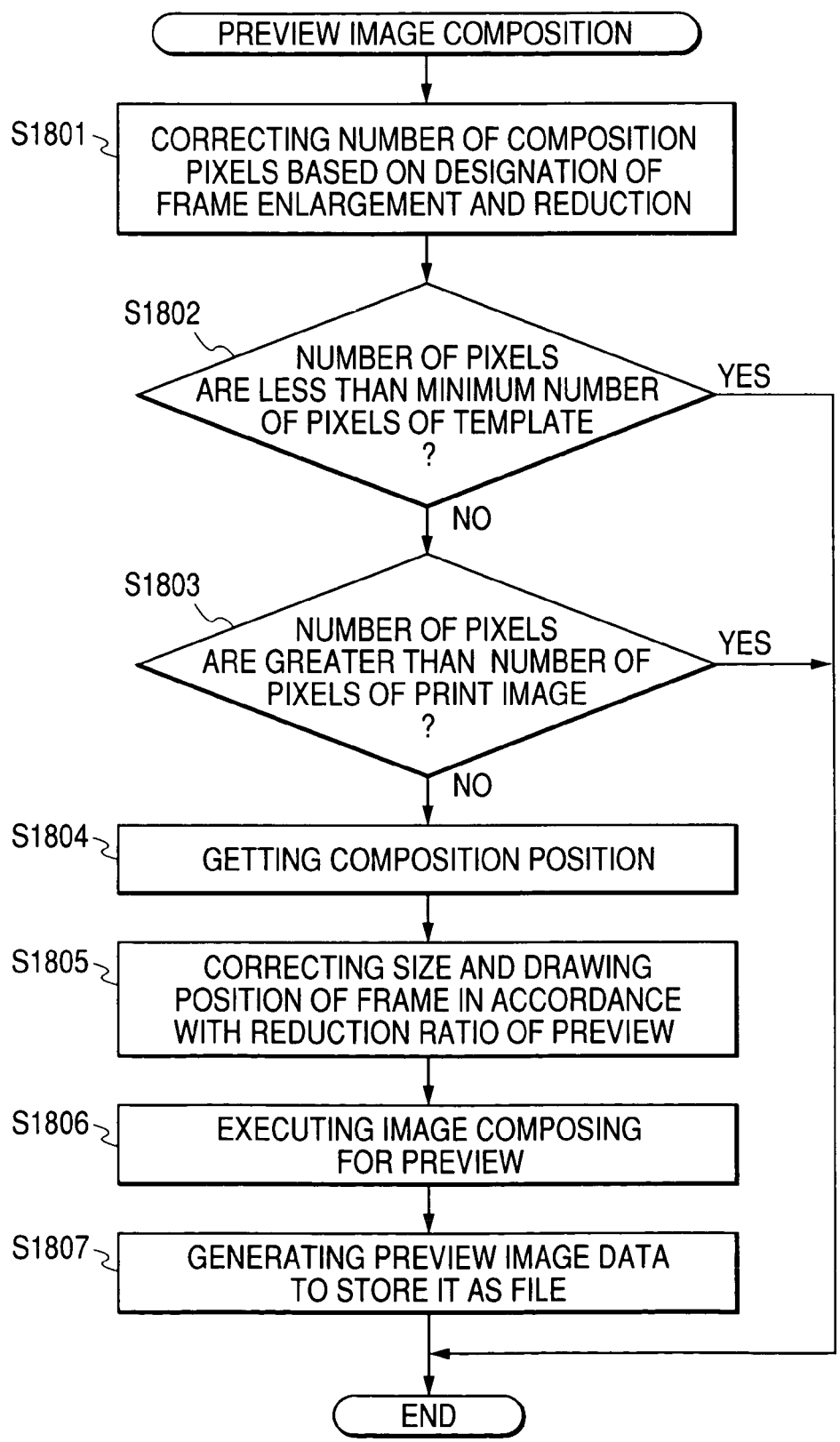
FIG. 18 is a flow chart showing a preview image composing process according to an embodiment of the present invention.

A sequence S1115 to be explained later also executes a preview image composition as shown in FIG. 18. However, the sequence S1115 utilizes, in addition to the composition image size record used in the sequence S1110, the pixel number of the print image and the pixel number of the preview image stored in the RAM 204, an enlargement/reduction rate of the composing area and the reference position generated from a process content corresponding to the key depressed in the portable terminal station 101a.

The preview image composition determines a composing position of the print image by a pixel position to store such position in the RAM 204, and executes a composition of a preview image. In the present embodiment, the image position CGI program and the image processing program 410 cooperate in executing such preview image composition.

In the present preview image composition, certain information are read out from the RAM 204, and such information are naturally data which is stored in correlation with the session ID and read out also in correlation with the current session ID.

Referring to FIG. 18, a step S1801 determines a pixel number in the print image composition, utilizing the standard vertical side pixel number 823 and the standard vertical side pixel number 824. Since an enlargement or a reduction of the composition size is possible in the present embodiment, the pixel number is determined according to the enlargement/reduction rate according to the instructed enlargement or reduction.

The enlargement/reduction rate is stored in the RAM 204. The enlargement or reduction is designated from the portable terminal station 101a in a sequence S1114 to be explained later, and the sequence S1115 converts the designation of the enlargement or reduction into the enlargement/reduction rate and stores it in the RAM 204. In the present embodiment, an enlargement or a reduction by 10% is executed by each designation. Also the sequence S1110 does not include the enlargement/reduction designation. Consequently, in the sequence S1110, the enlargement/reduction rate is not stored in the RAM 204. Therefore, the values in the composition image size record are employed and the RAM 204 stores a value 100% indicating an original size. As an example, a template "Frame 1" is to be employed in case of selection of an item of an item code "Seal 1", and the standard composition pixel numbers of "Frame 1" are identified as 100 pixels in the horizontal side and 140 pixels in the vertical side according to the composition image size record 8201.

Also in case an enlargement/reduction rate read out from the RAM 204 is 110%, the composition pixel numbers become, by multiplying 110% with the standard horizontal side pixel number 823 and the standard vertical side pixel number 824, 110 pixels (100*1.1=110) in the horizontal side and 154 pixels (140*1.1=154) in the vertical side.

The sequence S1110 does not have an enlargement/reduction rate as it is immediately after the image selection. Therefore, the composition pixel numbers become 100 pixels in the horizontal side and 140 pixels in the vertical side. 100 pixels in the horizontal side and 140 pixels in the vertical side are assumed in the following description.

A step S1802 compares the composition pixel numbers of the print image, determined in the step S1801, with the minimum horizontal side pixel number 825 and the minimum vertical side pixel number 826. In case the composition pixel numbers determined in the step S1801 are smaller than the minimum horizontal side pixel number 825 and the minimum vertical side pixel number 826, the preview image composition is interrupted since such numbers are less than the values for guaranteeing the print quality. On the other hand, in case the composition pixel numbers determined in the step S1801 are equal to or larger than the minimum horizontal side pixel number 825 and the minimum vertical side pixel number 826, the sequence proceeds to a step S1803.

A step S1803 compares the composition pixel numbers determined in the step S1801 with the pixel numbers of the print image informed in the sequence S1101. In case the composition pixel numbers determined in the step S1801 are larger than the pixel numbers of the print image informed in the sequence S1101, the composing process is regarded impossible and interrupted since the frame is larger than the print image and contains a blank area therein.

In case the numbers of composition pixels determined in the step S1801 are equal to or less than the pixel numbers of the print image, the composition is considered possible and the sequence proceeds to a step S1804.

A step S1804 reads composing position information from the RAM 204 and determines a composition start position. In the sequence S1110, since position designating information is not stored, a "center" is employed as an initial value. A value "center" is stored in the RAM 204. Therefore, in the sequence S1110, the center of the print image is taken as a reference position.

For example, in case an "image 1" has 160 pixels in the horizontal side and 180 pixels in the vertical side, since the composition pixel numbers determined in the step S1801 are 100 pixels in the horizontal side and 140 pixels in the vertical side, there are obtained 30 pixels ((160−100)/2=30) in the horizontal side and 20 pixels ((180−140)/2=20) in the vertical side. Therefore, the composition image area is identified to have 100 pixels in the horizontal side and 140 pixels in the vertical side, with an upper left corner positioned at 30 pixels in the horizontal direction and 20 pixels in the vertical direction from the upper left reference point of the print image.

On the other hand, in the sequence S1115, the print reference value designated in the sequence S1114 is stored in the RAM 204. For example, in case an upper center of the image is taken as the reference position, the reference position is at 0 pixel in the vertical direction and at 30 pixels ((160−100)/2=30) in the horizontal direction, so that the start position is at 30 pixels in the horizontal direction and 0 pixel in the vertical direction. On the other hand, in case taking the lower right corner as the reference position, there are obtained 60 pixels (160−100=60) in the horizontal side and 40 pixels (180−140=40) in the vertical side, so that the start position is at 60 pixels in the horizontal direction and 40 pixels in the vertical direction.

After the determination of the start position, the composition start position and the composition pixel numbers are stored in the RAM 204. Any already existing information is overwritten. Thus stored information is used as position information in case of composition with the print image.

A Step S1805 compares the pixel numbers of the preview image and those of the print image thereby determining a reduction rate.

As an example, in case the print image has 160 pixels in the horizontal side and 180 pixels in the vertical side while the preview image has 100 pixels in the horizontal side and 114 pixels in the vertical side, the reduction rate is identified as 62.5%.

A step S1806 executes a preview image composition. A preview image path acquired in a sequence S1111 to be explained later, a template storage location, a composition start position obtained up to the preceding step, a composition pixel number, a reduction rate, a storage path in an external storage apparatus 209 for storing the result of output, an image file name at the storage, and a process content of a preview composition are informed to the image processing program 410 thereby requesting a composing process for a preview image.

In a step S1807, the image processing program 410 generates preview image data containing a composition frame on the basis of thus informed contents, and stores such data as a file.

From Designation of Print Image Position Designation to Position Determination (Sequences S1112-S1116)

In a sequence S1112, the HTML data prepared in the sequence S1110 and the preview image in which the print position is indicated by a frame are transmitted to the portable terminal station 101a.

In the portable terminal station 101a, based on the received HTML data and the received preview image in which the print position is indicated by a frame, the web browser 601 displays a print position designating image shown in FIG. 15.

The print position designating image shown in FIG. 15 displays a preview image 1501 and a print position decision button 1502. The HTML data include a description, though not illustrated, for assigning the functions of print position designation, print area enlargement/reduction, and initialization to the numeral keys 1205. In the present embodiment, as explained in the foregoing, position designations are assigned to the "1"-"9" keys, initialization to the "0" key, print area reduction to "*" key and print area enlargement to "#" key (cf. FIG. 9).

In a sequence S1113, the operator of the portable terminal station 101a confirms the print area on the basis of the framed preview image 1501 displayed on the display 310. In case the print position is unsatisfactory, any of the "1"-"9" keys is depressed in order to move the print position and to transmit a print position designating request for designating thus moved print position. Since the preview image 1501 has a print position at the center, the print position is not moved by depressing the "5" key. The HTML data may also be so prepared as not to assign a function to a key which generates a meaningless request, such as the "5" key mentioned above.

The operator, in case of wishing an enlargement or a reduction of the print area, respectively depresses the "#" key or the "*" key.

Also in case the initial state is finally restored after repeated positional adjustments for regulating the print position, the "0" key is depressed to generate a request in which the print area is at the center and is represented by the standard horizontal side pixel number 823 and the standard vertical side pixel number 824.

Figure 16:
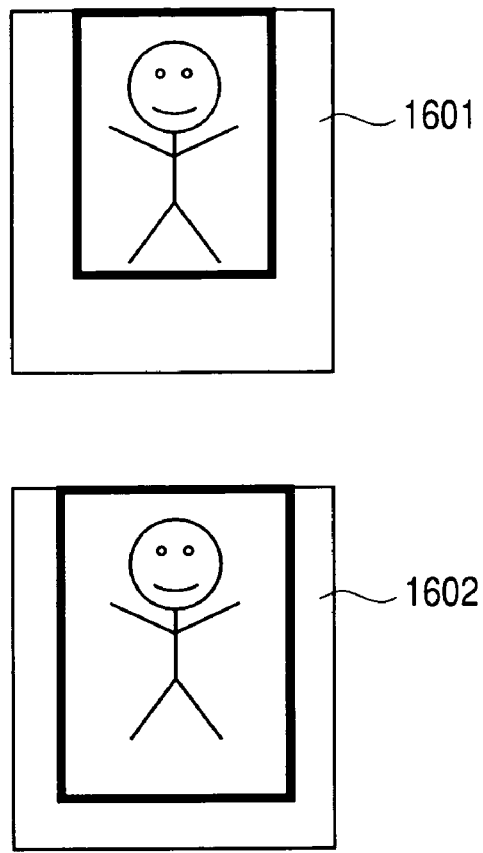
FIG. 16 is a view showing an example of display of a preview image in the print position designating image according to an embodiment of the present invention.

After the generation of the aforementioned print position designation request, the print order accepting server 104 executes a process (sequence S1115), and FIG. 16 shows an example of the preview image displayed on the display 310 when the portable terminal station 101a receives the result of such process.

In FIG. 16, 1601 denotes an example of an upward movement by the depression of the "2" key in order to move up the print position designation in the state of display shown in FIG. 15.

1602 denotes an example of an enlarged print area by the depression of the "#" key in the state of the upward moved example 1601.

Referring back to FIGS. 11A and 11B, in case the operator depresses any one of the numeral keys 1205 to transmit the print position designation in a sequence S1114, the portable terminal station 101 transmits a URL representing the activation of the image print position CGI program, the session ID and any one of symbols 0-9 corresponding to the numeral keys or either of the symbols # and * as the argument.

In a sequence S1115, there is activated the image print position CGI program which is employed also in the sequence S1111 in the print order accepting server 104. The CGI program receives a symbol, indicating a print position changing process as the argument. The CGI program executes a following process, utilizing the preview image acquired in the step S1111, and the print range reference position and the enlargement/reduction rate of the print area stored in the RAM 204.

The image print position CGI program in the sequence S1115 executes, utilizing the symbol received as the argument and indicating the print position changing process, a retrieval and an acquisition of a record matching the operation key 902 of the image composition position designating table in the image composition position designating database 403, through the database program 407.

In case of the upward movement display 1602 shown in FIG. 16, there is acquired an image composition position designating record 9012 having the "2" key. More specifically, the operation code 901 is a composition position designation, and there is acquired the image composition position designating record 9012 in which the reference position 903 is at the upper center.

In case the operation code 901 is a composition position designation, the image print position CGI program overwrites the print range reference position stored in the RAM 204, thereby renewing the content thereof. In case of an image reduction, the print area enlargement/reduction rate stored in the RAM 204 is once read, then an immediately preceding enlargement/reduction rate is stored in the RAM 204, which is then renewed by an overwriting with a value obtained by reducing the enlargement/reduction rate by 10%. For example, in case 110% is stored, 110% is stored as the immediately preceding enlargement/reduction rate, and 100% is stored as the overwriting enlargement/reduction rate.

Also in case the operation code 901 is an image enlargement, the print area enlargement/reduction rate stored in the RAM 204 is once read, then an immediately preceding enlargement/reduction rate is stored in the RAM 204, which is then renewed by an overwriting with a value obtained by increasing the enlargement/reduction rate by 10%. For example, in case 110% is stored, 110% is stored as the immediately preceding enlargement/reduction rate, and 120% is stored as the overwriting enlargement/reduction rate.

In case the operation code 901 is an initialization, the print area enlargement/reduction rate stored in the RAM 204 is overwritten to 100%, and the print range reference position stored in the RAM 204 is overwritten to the center. The printing range reference position, the immediately preceding enlargement/reduction rate and the enlargement/reduction rate mentioned above are stored in correlation with the session ID.

Then, the selected item code stored in the RAM 204 is used as a retrieval key to retrieve and acquire, through the database program 407, a record in which the item code stored in the item code 801 in the template database 402 matches the selected item.

Then the template code in the acquired template record is used as a retrieval key to search the template management table and the composition image size table in the template database 402, thereby acquiring a record in which the template records 811, 821 match the template code of the retrieval key.

Then the pixel number of the print image and the pixel number of the preview image, corresponding to the selected image, are read out from the composition image size record and the RAM 204. Then a composing process for the print area preview image data for informing the image print area is executed as explained in the sequence S1110 in relation to FIG. 18, thereby generating preview image data in which a new print area is indicated by a frame.

In case an enlargement or a reduction of the print area is designated, the composing process may be interrupted in the step S1802 or S1803 shown in FIG. 18. In the present embodiment, in case of such interruption, there is executed a process of reading the immediately preceding enlargement/reduction rate stored in the RAM 204, changing back to the print area enlargement/reduction rate and transmitting the previously prepared preview image.

After the preparation of the preview image, HTML data are prepared in the same manner as in the sequence S1110, and are transmitted to the internet 106. Thereafter the flow returns to the sequence S1112. Then the operation, returning to the sequence S1113 and accepting the print range therein, depresses the print position decision button 1501, thereby proceeding to a sequence S1116.

In a sequence S1116, there is transmitted an HTTP request for activating a succeeding print base selecting CGI program, including a URL and the session ID as the argument.

From Print Base Selection to Order Instruction (Sequences S1117-S1127)

In a sequence S1117, the print order accepting server 104 receives the HTTP request transmitted in the sequence S1116 and the print base selection CGI program contained in the CGI program 406 is activated. The print base selection program acquires the sold item stored in the RAM 204 and searches the item output location table in the goods information database 401, thereby retrieving a record with a matching item code 711.

In the present embodiment, since the selected item is "Seal 1", the item output location records 7101, 7102 are acquired. Then the print base code 711 is used as a key to search and retrieve records whose print base codes 1001 match with each other from the print base management table of the print base management database 404. In the present embodiment, the records 10011, 10012 with a print base code "1" or "2" are acquired.

Figure 17:
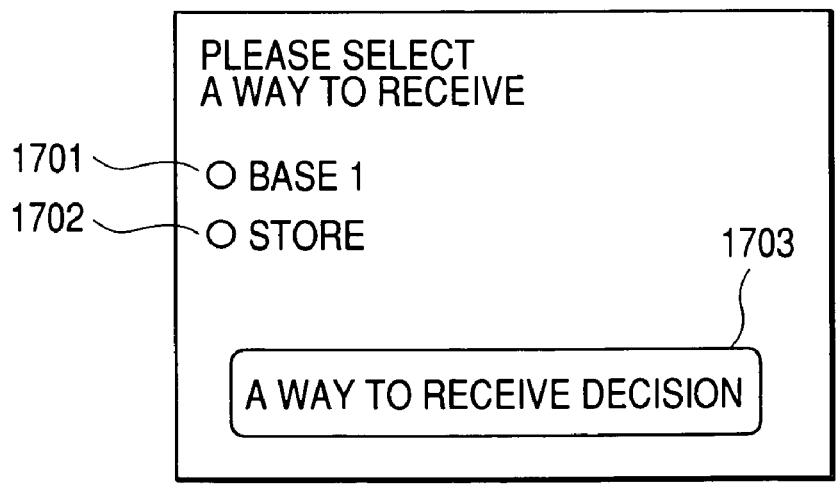
FIG. 17 is a view showing an example of display of a print base selecting image according to an embodiment of the present invention.

Then HTML data for displaying the print base selecting image as shown in FIG. 17 on the display 311 of the portable terminal station 101a are generated and transmitted to the internet 106. A sequence S1118 transmits the HTML data, generated in the sequence S1118, to the portable terminal station 101a.

The portable terminal station 101a receives the HTML data generated in the sequence S1117 and displays the print base selecting image as shown in FIG. 17.

In FIG. 17, there are shown a radio button 1701 for selecting the Base 1, and a ratio button 1702 for selecting the store. For the radio buttons 1701 and 1702, the HTML data are so described as to inform the base code as the argument. 1703 indicates a print base decision button describing a URL of a succeeding order information input CGI program, in such a manner as to generate an HTTP request with the selected ratio button and the session ID as the argument.

In a sequence S1119, the operator of the portable terminal station 101a selects the print base and depresses the print base decision button 1703.

In the present embodiment, the print base names are displayed and the print base is selected directly, but it is also possible to adopt a configuration of executing a first-step selection by the delivery and the store reception, and further executing a selection of the store in case of store reception, or, in case of delivery, judging the print base by the print order accepting server 104 according to the destination of delivery.

A sequence S1120 transmits the HTTP request, generated in the sequence S1119, to the print order accepting server 104.

In a sequence S1121, the order information input CGI program is activated in the print order accepting server 104, then the selected print base code is stored in the RAM 204, and HTML data for realizing an order information input are generated and transmitted to the internet 106.

Following sequences S1122 to S1127 are merely briefly explained as they are not directly featuring the present invention.

In the portable terminal station 101a, based on the received order information input image, information necessary for print order such as an ordered number and a name of the orderer are entered and transmitted to the print order accepting server 104. The print order accepting server 104 stores the order information in the RAM 204 and generates and transmits HTML data for displaying an order confirming image to the portable terminal station 101a. Then, the operator of the portable terminal station 101a confirms the content of the order on the basis of the order confirming image, and, upon agreeing to such content, executes a predetermined operation. Based on such operation, the portable terminal station 101a generates an order instruction to the print order accepting server 104.

Up to Print Data Storage (Sequences S1128-S1132)

In a sequence S1128, an order accept completing CGI program is activated to read out various information stored in the RAM 204, to newly issue and register an order code in the order database 405 together with the items to be stored in the order information. In this stage, HTML data are generated to display the completed print order and an order end image.

In a sequence S1129, the order end image is transmitted to the portable terminal station 101a, and the portable terminal station 101a displays the received HTML data on the display 311. Then the operator of the portable terminal station 101a terminates the connection with the internet 106 by the disconnection button 1204.

In a step S1130, the order acceptance completing CGI program in the print order accepting server 104 remains active from the sequence S1128, and executes a composing process with the template, based on the composing position and the composition pixel number stored at the execution of the preview image composition in the sequence S1110 or S1115. The composition with the template is executed only in case the print base, designated as the output location, has a server composition, namely a print base in which the server composition designation 1004 in the print base management database 404 is "yes".

The present embodiment will be explained in case "store" is selected as the print base.

At first the print image data are acquired in the same manner as in the sequence S1111 for obtaining the preview image data from the album server 103. A print data acquiring request character train, corresponding to the image name for which a print order is received, is acquired from the RAM 204. Then an HTTP request is generated to the album server 103 to obtain print image data, which are stored as a file in the external storage apparatus 209.

Then the composition start position and the composition pixel number of the print image data, stored in the RAM 204 in the step S1804 in the sequence S1110 or S1115, are read out, and, the template storing location 814, the image start position 822 and the number 803 of repetition corresponding to the ordered item are read out from the RAM 204 or acquired by searching again the database. Then a template path, a print image path, a image start position in the template, a composition start position of the print image, the number of composition pixels, a storage path in the external storage apparatus 204 for storing the output result, an image file name at storage, and a process content of print data composition are informed to the image processing program 410 and a print image composing process is requested.

When the print image composition is completed, a print instruction data file is generated from the order database 405 and is stored, together with the print image data file, in a predetermined directory of the print data storage area 409 thereby completing the sequence S1132.

On the other hand, in case the print image composition is not designated, in place for the print image composition, a print data file, a template file and an order database 405 acquired in the sequence S1131, and a print instruction data file to which image composition information is added are stored in a predetermined directory of the print data storage area 409 whereby the sequence S1132 is completed.

In the present embodiment, the print instruction data file is generated in the sequence S1130, but a similar result can be obtained by generating it simultaneously with the registration in the order database 405 in the sequence S1128.

Print Image Composing Process

Figure 19:
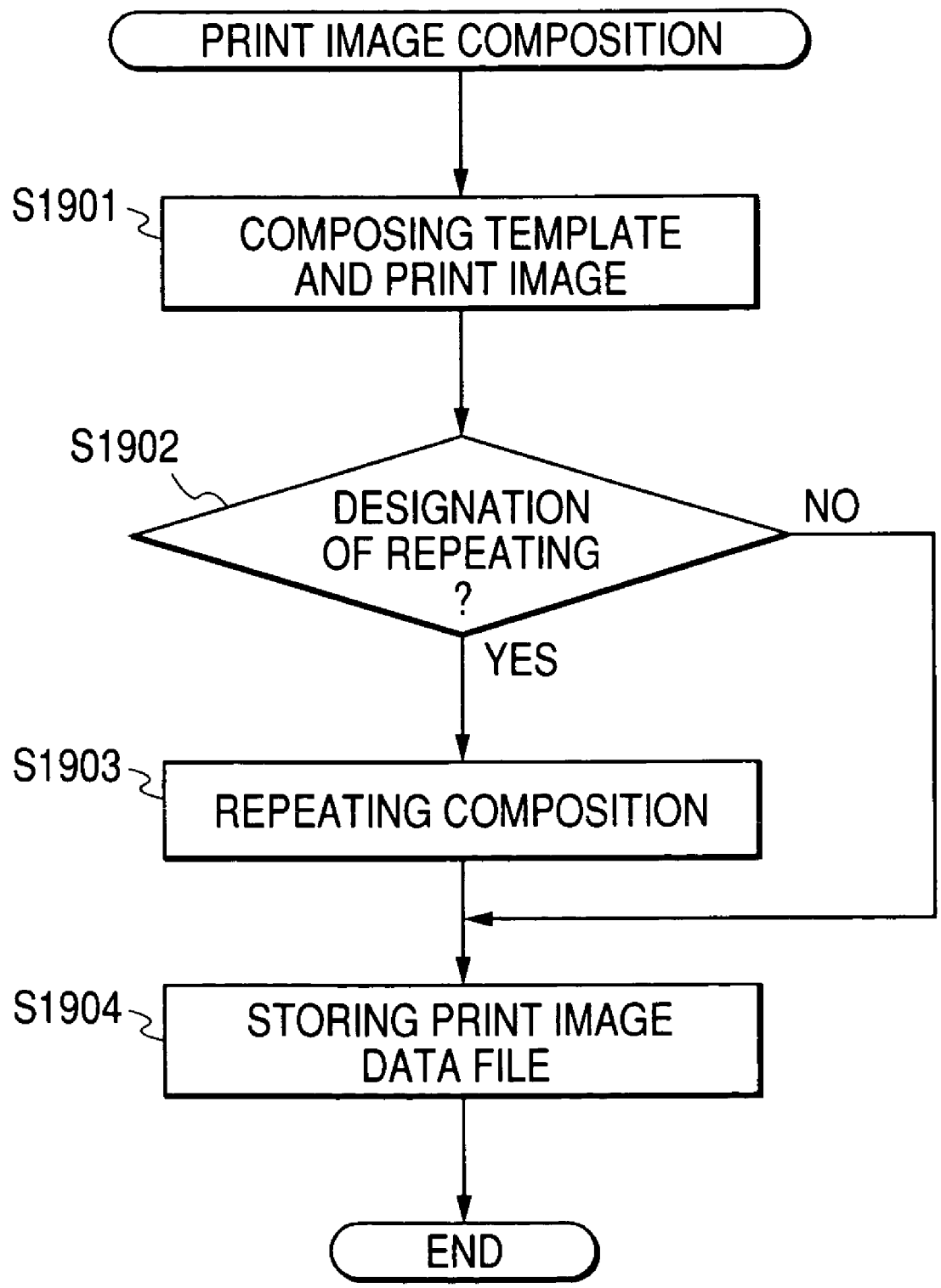
FIG. 19 is a flow chart showing a print image composing process according to an embodiment of the present invention.

Now reference is made to FIG. 19 for explaining an example of the process (print image composing process) of the image processing program 410 in the sequence S1130.

A step S1901 executes a composition of a template and a print image, and generates composition print image data.

There is executed a composition of a rectangle of the composition pixel number, starting from the start position in the template with the upper left image start position of the print image data. The result of composition is stored in the RAM 204.

A step S1902 discriminates whether a repetition is present. In case repetition is present, a step S1903 executes a composition by repeating the result of composition of the step S1901 in the vertical and horizontal arrangement designated by the repetition number, thereby generating composed print image data.

On the other hand, in case the step S1902 identifies absence of repetition, or after the execution of the step S1903, a step S1904 stores the composed print image data as a print image data file, with a designated file name in a designated storage path.

In the foregoing, there has been explained an embodiment realizing the present invention. In the present embodiment, there has been explained a case of ordering a printing of a composed image formed by an image held in the album server 103 with a frame, but it is also possible to connect an external memory such as a memory card 313 storing an image captured with a digital camera to the portable terminal station 101, to upload the image in the memory card from the portable terminal station 101 to the print order accepting server through the internet, and to instruct a composition.

It is furthermore possible that the portable terminal station 101 generates a preview image by an application program functioning in the portable terminal station 101 and informs the print order accepting server 104 of a designation of the print position, a designation of the print range and a size change executed on thus generated preview image.

Also as another embodiment, in case an application program functioning in the portable terminal station 101 is used to compose an image, stored in the portable terminal station 101, with a template, it is also possible to execute an input to the print position designating function of such application program by a key operation and to execute the print position designating function based on such key operation, and the present invention can also be sufficiently realized in this manner.

Also as still another embodiment, in case an application program functioning in the portable terminal station 101 is used to compose an image, stored in the portable terminal station 101, with a template, it is also possible to execute an input to the print position designating function of such application program by a key operation to which an instruction for an image size designation is assigned and to determined the image size by instructing an enlargement or a reduction of the image based on such key operation, and the present invention can also be sufficiently realized in this manner.

Other Embodiments

The present invention also includes a case where program codes of a software realizing the functions of the aforementioned embodiments are supplied to a computer of a system or an apparatus connected with various devices so as to realize the functions of the aforementioned embodiments and the various devices are operated according to the program stored in the computer (CPU or MPU) of the above-mentioned system or apparatus.

In such case the program codes themselves of the software realize the novel functions of the aforementioned embodiments, and the program codes themselves, and the means for supplying the computer with such program codes for example a memory medium storing the program codes constitutes the present invention. The memory medium storing such program codes can be, for example, a flexible disk, a hard disk, an optical disk, a magneto optical disk, a CD-ROM, a magnetic tape, a non-volatile memory card, or a ROM.

Such program codes are included in the embodiment of the present invention not only in a case where the functions of the aforementioned embodiments are realized by the execution of the program codes read by the computer but also a case where the program codes realize the functions of the aforementioned embodiments in cooperation with an manipulating system or the like functioning on the computer.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

Many widely different embodiments of the present invention may be constructed without departing from the spirit and scope of the present invention. It should be understood that the present invention is not limited to the specific embodiment described in the specification, except as defined in the appended claims.

This application claims priority from Japanese Patent Application Nos. 2003-350877 filed on Oct. 9, 2003, 2003-350878 filed on Oct. 9, 2003, 2003-350879 filed on Oct. 9, 2003 and 2003-350880 filed on Oct. 9, 2003, which are hereby incorporated by reference herein.

What is claimed is:

1. A print order receiving apparatus for receiving, from a client terminal apparatus, an order for printing an image by composing the image into a template frame, comprising:
   first transmitting means for transmitting, to said client terminal apparatus, preview image data of a preview image composed with an area designating frame;
   managing means for managing a table which assigns a position designation of the area designating frame to a numeral key of said client terminal apparatus;
   obtaining means for obtaining, from said client terminal apparatus, a kind of a numeral key designated by said client terminal apparatus and a number of times the designated numeral key is used repeatedly by said client terminal apparatus;
   first generating means for generating print image data by composing a print image corresponding to the preview image into the template frame by performing resizing to a designation position on the basis of an enlargement/reduction ratio designated in accordance with the numeral key of the kind obtained by said obtaining means and the number of times obtained by said obtaining means;
   calculating means for calculating a number of composed image pixels on the basis of a standard number of pixels of the image to be composed into the template frame and the designated enlargement/reduction ratio in accordance with the numeral key of the kind obtained by said obtaining means and the number of times obtained by said obtaining means;
   second generation means for generating the preview image, if the number of composed image pixels, calculated by said calculating means, is larger than a predetermined minimum number of pixels of the image to be composed into the template frame or smaller than the number of pixels of the print image corresponding to the preview image; and
   second transmitting means for transmitting the print image data generated by said generating means to a print server apparatus connected to a print apparatus.

2. The apparatus according to claim 1, further comprising third transmitting means for transmitting the preview image generated in accordance with the enlargement/reduction ratio designated immediately before to the client terminal apparatus, if the second generation means cancels the preview image generation processing.

3. A control method performed by a print order receiving apparatus for receiving, from a client terminal apparatus, an order for printing images by composing an image into a template frame, said control method comprising the steps of:
   transmitting, to said client terminal apparatus, preview image data of a preview image composed with an area designating frame;
   managing a table which assigns a position designation of the area designating frame to a numeral key of said client terminal apparatus;
   obtaining, from said client terminal apparatus, a kind of a numeral key designated by said client terminal apparatus and a number of times the designated numeral key is used repeatedly by said client terminal apparatus;
   a first generating step of generating print image data by composing a print image corresponding to the preview image into the template frame by performing resizing to a designated position on the basis of an enlargement/reduction ratio designated in accordance with the numeral key of the kind obtained in said obtaining step and the number of times obtained in said obtaining step;
   calculating a number of composed image pixels on the basis of a standard number of pixels of the image to be composed into the template frame and the designated enlargement/reduction ratio in accordance with the numeral key of the kind obtained in said obtaining step and the number of times obtained in said obtaining step;
   a second generating step of generating the preview image, if the number of composed image pixels, calculated in said calculating step, is larger than a predetermined minimum number of pixels of the image to be composed into the template frame or smaller than the number of pixels of the print image corresponding to the preview image; and
   transmitting the print image data generated in said first generating step to a print server apparatus connected to a print apparatus.

4. A computer-readable storage medium storing thereon a control program comprising code for causing a computer to execute a control method of a print order receiving apparatus for receiving, from a client terminal apparatus, an order for printing images by composing an image into a template frame, said control program comprising the steps of:
   transmitting, to said client terminal apparatus, preview image data of a preview image composed with an area designating frame;
   managing a table which assigns a position designation of the area designating frame to a numeral key of said client terminal apparatus;
   obtaining, from said client terminal apparatus, a kind of a numeral key designated by said client terminal apparatus and a number of times the designated numeral key is used repeatedly by said client terminal apparatus;
   a first generating step of generating print image data by composing a print image corresponding to the preview image into the template frame by performing resizing to a designated position on the basis of an enlargement/reduction ratio designated in accordance with the position assigned by the table to the numeral key of the kind obtained in said obtaining step and the number of times obtained in said obtaining step;

calculating a number of composed image pixels on the basis of a standard number of pixels of the image to be composed into the template frame and the designated enlargement/reduction ratio in accordance with the numeral key of the kind obtained in said obtaining step and the number of times obtained in said obtaining step;

a second generating step of generating the preview image, if the number of composed image pixels, calculated in said calculating step, is larger than a predetermined minimum number of pixels of the image to be composed into the template frame or smaller than the number of pixels of the print image corresponding to the preview image; and transmitting the print image data generated in said generating step to a print server apparatus connected to a print apparatus.

* * * * *